United States Patent
Porterfield

(10) Patent No.: US 10,977,320 B2
(45) Date of Patent: *Apr. 13, 2021

(54) SYSTEMS AND METHODS FOR CANCELLING A QUERY

(71) Applicant: Google LLC, Mountain View, CA (US)

(72) Inventor: Benjamin Porterfield, San Francisco, CA (US)

(73) Assignee: Google LLC, Mountain View, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/261,509

(22) Filed: Jan. 29, 2019

(65) Prior Publication Data
US 2019/0155855 A1 May 23, 2019

Related U.S. Application Data

(63) Continuation of application No. 14/061,562, filed on Oct. 23, 2013, now Pat. No. 10,191,984, which is a continuation-in-part of application No. 13/839,559, filed on Mar. 15, 2013, now Pat. No. 9,824,118.

(51) Int. Cl.
*G06F 16/00* (2019.01)
*G06F 16/951* (2019.01)
*G06F 16/242* (2019.01)

(52) U.S. Cl.
CPC ........ *G06F 16/951* (2019.01); *G06F 16/2425* (2019.01)

(58) Field of Classification Search
CPC ............................ G06F 16/951; G06F 16/2425
See application file for complete search history.

(56) References Cited

U.S. PATENT DOCUMENTS

| | | | | |
|---|---|---|---|---|
| 6,754,701 B1 * | 6/2004 | Kessner | ............... | G06F 11/3414 709/203 |
| 6,834,282 B1 * | 12/2004 | Bonneau | ............... | G06F 16/9027 |
| 8,375,014 B1 * | 2/2013 | Brocato | ............... | G06F 16/213 707/705 |
| 9,015,190 B2 * | 4/2015 | Carter | ................... | G06F 16/532 707/769 |
| 2002/0085555 A1 * | 7/2002 | Jung | ..................... | H04L 69/329 370/389 |

(Continued)

*Primary Examiner* — Jared M Bibbee
(74) *Attorney, Agent, or Firm* — Honigman LLP; Brett A. Krueger

(57) ABSTRACT

Systems and methods for querying a database are disclosed. A server computing device includes a processor and a memory storing instructions that, when executed by the processor, cause the server computing device to: receive a query input from a client device over a network connection; establish a non-blocking socket between the client computing device and the server computing device; generate a database query based on the query input; cause the database query to begin executing against one or more databases; perform a read request on the non-blocking socket; receive a code in response to the read request on the non-blocking socket; determine whether the network connection exists between the client device and the server device based on the received code; and cause the database query to be cancelled when the server determines that the network connection does not exist between the client device and the server device.

9 Claims, 18 Drawing Sheets

(56) References Cited

U.S. PATENT DOCUMENTS

| | | | | |
|---|---|---|---|---|
| 2002/0188702 A1* | 12/2002 | Short, III | ................ | G06F 16/25 |
| | | | | 709/220 |
| 2003/0220893 A1* | 11/2003 | Dettinger | .............. | G06F 16/252 |
| 2005/0004911 A1* | 1/2005 | Goldberg | ............ | G06F 16/2428 |
| 2005/0203890 A1* | 9/2005 | Chen | ..................... | G06F 16/252 |
| 2006/0095571 A1* | 5/2006 | Gilgen | .................... | H04L 67/02 |
| | | | | 709/225 |
| 2006/0271884 A1* | 11/2006 | Hurst | ....................... | G06F 16/34 |
| | | | | 715/854 |
| 2011/0276588 A1* | 11/2011 | Moon | ............... | G06F 16/90328 |
| | | | | 707/769 |
| 2011/0314145 A1* | 12/2011 | Raleigh | ............... | H04W 28/021 |
| | | | | 709/224 |
| 2012/0084328 A1* | 4/2012 | Ishikawa | ............. | G06F 16/3323 |
| | | | | 707/805 |
| 2014/0108868 A1* | 4/2014 | Neerincx | ............ | G06F 11/0793 |
| | | | | 714/39 |

\* cited by examiner

Tables:

table:users

| id | name | email |
|---|---|---|
| 1 | Ben | ben@test.com |
| 2 | TJ | tj@test.com |

← 402 table:orders

| id | date | user_id |
|---|---|---|
| 1 | 1/12/13 | 1 |
| 2 | 1/12/13 | 2 |
| 3 | 2/3/13 | 2 |
| 4 | 2/3/13 | 2 |

← 404 table:order_items

| id | order_id | item_name | cost |
|---|---|---|---|
| 1 | 1 | Item1 | 10$ |
| 2 | 2 | Item2 | 15$ |
| 3 | 3 | Item3 | 20$ |
| 4 | 4 | Item4 | 20$ |

| # | AIRPORTS Code | AIRPORTS City | AIRPORTS State | AIRPORTS Full Name | AIRPORTS Control Tower (Yes/No) | AIRPORTS Facility Type |
|---|---|---|---|---|---|---|
| 1 | 08R | WEST KINGSTON | RI | RICHMOND | No | AIRPORT |
| 2 | BID | BLOCK ISLAND | RI | BLOCK ISLAND STATE | No | AIRPORT |
| 3 | OQU | NORTH KINGSTOWN | RI | QUONSET STATE | Yes | AIRPORT |
| 4 | PVD | PROVIDENCE | RI | THEODORE FRANCIS GREEN STATE | Yes | AIRPORT |
| 5 | RI01 | WARWICK | RI | KENT COUNTY MEMORIAL HOSPITAL | No | HELIPORT |
| 6 | RI05 | CRANSTON | RI | PORT EDGEWOOD MARINE | No | HELIPORT |
| 7 | RI06 | TIVERTON | RI | TIVERTON | No | SEAPLANE BASE |
| 8 | RI07 | TIVERTON | RI | WING-OVER FARM | No | AIRPORT |
| 9 | RI08 | WAKEFIELD | RI | SOUTH COUNTY HOSPITAL | No | HELIPORT |
| 10 | RI09 | PORTSMOUTH | RI | PORTSMOUTH RAMADA | No | HELIPORT |
| 11 | RI11 | GREENE | RI | PICONN | No | AIRPORT |
| 12 | RI12 | NORTH KINGSTOWN | RI | QUONSET STATE ARNG HELIPAD | No | HELIPORT |
| 13 | RI13 | WEST KINGSTON | RI | FOXRIDGE FARM | No | HELIPORT |
| 14 | RI14 | PROVIDENCE | RI | H CHAMBERS CADILLAC | No | HELIPORT |
| 15 | RI15 | PROVIDENCE | RI | ONE HOSPITAL TRUST | No | HELIPORT |
| 16 | RI16 | COVENTRY CENTER | RI | RESKINEN | No | BALLOONPORT |
| 17 | RI20 | CRANSTON | RI | MYSTERY FARM | No | AIRPORT |
| 18 | RI21 | NEWPORT | RI | GOAT ISLAND | No | HELIPORT |
| 19 | RI22 | PROVIDENCE | RI | CAPITAL CENTER | No | HELIPORT |
| 20 | RI23 | WESTERLY | RI | WESTERLY HOSPITAL | No | HELIPORT |
| 21 | RI24 | NEWPORT | RI | DUKE | No | HELIPORT |
| 22 | RI25 | PROVIDENCE | RI | RHODE ISLAND HOSPITAL | No | HELIPORT |
| 23 | RI26 | WOONSOCKET | RI | LANDMARK MEDICAL CENTER | No | HELIPORT |
| 24 | RI30 | CHARLESTOWN | RI | EAST ARNOLDA FARM | No | HELIPORT |
| 25 | RI9 | PROVIDENCE | RI | DOWNTOWN PROVIDENCE HELISTOP | No | HELIPORT |
| 26 | SFZ | PAWTUCKET | RI | NORTH CENTRAL STATE | No | AIRPORT |
| 27 | UUU | NEWPORT | RI | NEWPORT STATE | No | AIRPORT |
| 28 | WST | WESTERLY | RI | WESTERLY STATE | No | AIRPORT |

SYSTEMS AND METHODS FOR CANCELLING A QUERY

CROSS-REFERENCE TO RELATED APPLICATIONS

This application is a Continuation Application of U.S. application Ser. No. 14/061,562, filed on Oct. 23, 2013, entitled "SYSTEMS AND METHODS FOR CANCELLING A QUERY", which is a continuation-in-part (CIP) of application Ser. No. 13/839,559, filed on Mar. 15, 2013, each of which is hereby incorporated by reference in their entirety.

BACKGROUND

Many entities store data items on one or more databases. These databases often include tables with columns and rows. Each column in the table is associated with a particular data field. Entries in the table are organized in rows, with data corresponding to the entries stored in the columns for that particular row.

One problem often encountered with storing data in databases is effectively querying the data. In some instances, the data for a particular entity may be spread out across multiple database tables. When the data set is large and spread out across multiple database tables, querying the data to return useful results can become a complicated and daunting task. Additionally, since the relationship between different database tables may not be readily understood by the person generating the query, generating a query can be error-prone.

SUMMARY

One embodiment provides a method for querying one or more databases. The method includes: receiving, at a computing device, a selection of a starting node, wherein the starting node is included in a model that corresponds to one or more database tables; receiving, at the computing device, a selection of a first set of one or more leaves, wherein each leaf is connected to a node in the model; generating a first database query based on the starting node and the first set of leaves; providing a first results output based on the first database query executing on the one or more databases; receiving a selection of a result in the first results output; generating a second database query based on the selection of the result in the first results output, wherein the second database query is associated with a detail set associated with the result; and providing a second results output based on the second database query executing on the one or more databases.

Another embodiment provides a method for generating a database query. The method comprises: generating five data sets to store database query fragments; for each leaf in a first set, adding one or more database query fragments to one or more of the five data sets based on attributes of the leaf; and constructing the first database query by appending together the database query fragments from the five data sets.

Yet another embodiment provides a system for generating a database query. The system includes: one or more databases; a client device; and a server. The server is configured to: receive a model input from the client device over a data network, wherein the model input includes a node and a first set of leaves included in a model corresponding to one or more database tables stored in the one or more databases; generate a plurality of data sets to store database query fragments; for each leaf in the first set, add one or more database query fragments to one or more of the plurality of data sets based on attributes of the leaf; construct a database query by appending together the database query fragments from the plurality of data sets; execute the database query against the one or more databases; and return results of the database query to the client device.

Yet another embodiment provides a server configured to: receive a model input from a client device over a data network, wherein the model input includes a node and a first set of leaves included in a model corresponding to one or more database tables stored in one or more databases; generate a plurality of data sets to store database query fragments; for each leaf in the first set, add one or more database query fragments to one or more of the plurality of data sets based on attributes of the leaf; construct a database query by appending together the database query fragments from the plurality of data sets; execute the database query against the one or more databases; and return results of the database query to the client device.

Yet another embodiment provides a method for querying a database. The method includes: receiving, at a server device, a query input from a client device over a network connection; generating a database query based on the query input; causing the database query to begin executing against one or more databases; determining whether a network connection exists between the client device and the server device; and causing the database query to be cancelled when the server determines that the network connection does not exist between the client device and the server device.

Still further embodiments provide for systems and methods for querying a database and cancelling such query. For example, a server computing device may include a processor and a memory. The memory stores instructions that, when executed by the processor, cause the server computing device to: receive a query input from a client device over a network connection; establish a non-blocking socket between the client computing device and the server computing device; generate a database query based on the query input; cause the database query to begin executing against one or more databases; perform a read request on the non-blocking socket; receive a code in response to the read request on the non-blocking socket; determine whether the network connection exists between the client device and the server device based on the received code; and cause the database query to be cancelled when the server determines that the network connection does not exist between the client device and the server device.

BRIEF DESCRIPTION OF THE DRAWINGS

FIG. 4 is a conceptual diagram of one or more database tables, according to an example embodiment.

FIG. 14 is a conceptual diagram illustrating a user interface for displaying a results output for querying one or more databases associated with the model input of FIG. 13 after selecting a result from a previous results output, according to an example embodiment.

FIG. 16 is a conceptual diagram illustrating a user interface for displaying a results output for querying one or more databases associated with the model input of FIG. 15 after selecting a result from a previous results output, according to an example embodiment.

DETAILED DESCRIPTION

Figure 1:
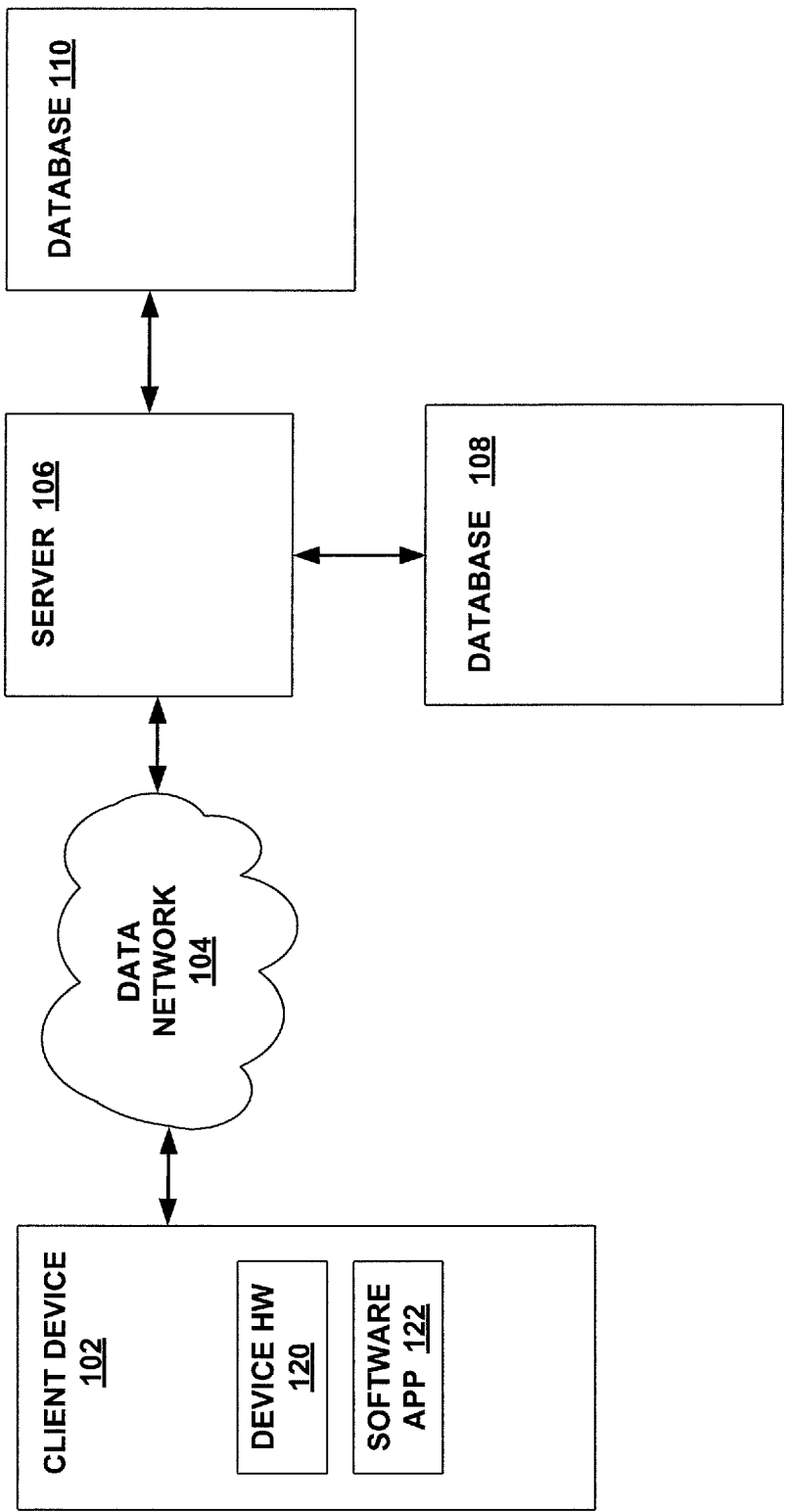
FIG. 1 is a block diagram of an example system for querying one or more databases, according to an example embodiment.

FIG. 1 is a block diagram of an example system for querying one or more databases, according to an example embodiment. The system includes a client device 102, a data network 104, one or more servers 106, and databases 108 and 110.

The client device 102 can be any type of computing device, including a personal computer, laptop computer, mobile phone with computing capabilities, or any other type of device. The client device 102 includes, among other things, device hardware 120, a software application 122, other application(s), a communications client, output devices (e.g., a display), and input devices (e.g., keyboard, mouse, touch screen), etc. In some embodiments, a client device 102 may act as both an output device and an input device.

Device hardware 120 includes physical computer components, such as a processor and memory. The software application 122 is configured to receive input for querying the one or more databases 108, 110. According to various embodiments, the software application 122 can be implemented in the OS (operating system) of the client device 102 or as a stand-alone application installed on the client device 102. In one embodiment, the software application 122 is a web browser application.

The data network 104 can be any type of communications network, including an Internet network (e.g., wide area network (WAN) or local area network (LAN)), wired or wireless network, or mobile phone data network, among others.

The client device 102 is configured to communicate with a server 106 via the data network 104. The server 106 includes a software application executed by a processor that is configured to generate a query against the databases 108, 110 based on an input received from the client device 102. The server 106 is in communication with databases 108 and 110. The databases 108, 110 are configured to store data. The databases 108, 110 can be any type of database, including relational databases, non-relational databases, file-based databases, and/or non-file-based databases, among others.

As described in greater detail herein, one or more embodiments of the disclosure provide a system and method for querying one or more databases. As described, databases are often organized as a series of tables. According to various embodiments, a database querying model can be constructed as a series of interconnected "nodes," where each node corresponds to a database table. Each node can be connected to zero or more other nodes. Each node can also be associated with one or more "leaves," where each leaf corresponds to one of the columns in the corresponding database table. Each leaf can further be associated with an identifier, a "leaf type," and zero or more detail parameters, as described in greater detail herein.

A model input is generated based on a selection of a starting node, one or more leaves, and zero or more filters at the client device 102. The model input is transmitted to the server 106 via the data network 104. The server 106 receives the model input and generates a database query based on the model input. The database query is executed on the one or more databases and returns results.

As stated, the model input includes selection of a single starting node, one or more leaves, and zero or more filters. The one or more leaves can be leaves of the selected starting node and/or leaves of nodes that are connected to the starting node. As described in greater detail herein, each leaf includes a leaf identifier, a leaf type, and optionally a "detail set," among other things.

Figure 18:
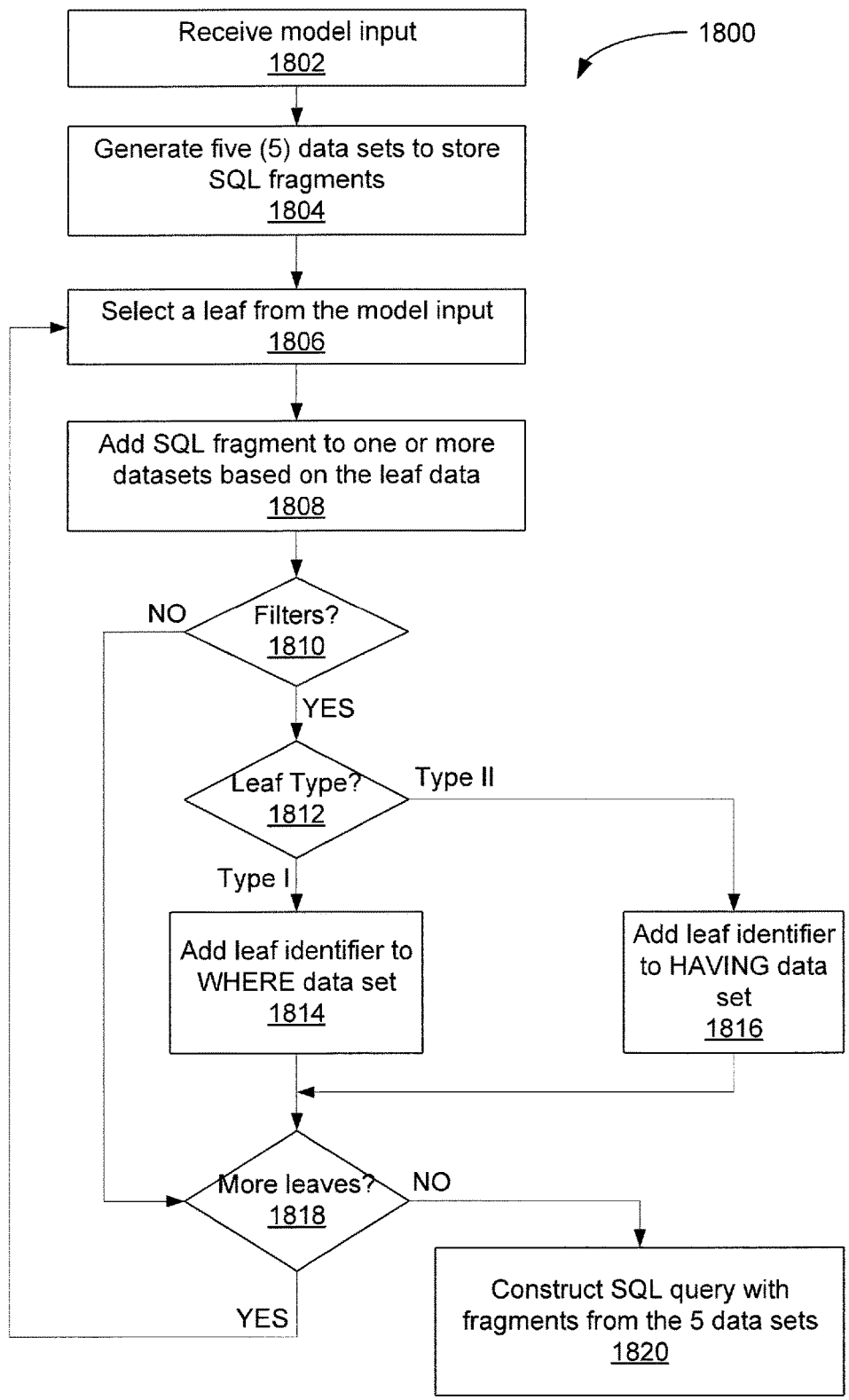
FIG. 18 is a flow diagram of method steps for generating a database query from a model input, according to an example embodiment.

To generate the database query from the model input, the server 106 executes a query generation algorithm, described in greater detail in FIG. 18. Namely, for each of the selected leaves, the server 106 determines whether the leaf is reachable from the selected node by way of interconnected nodes. If not, the leaf is ignored. Using the selected node and set of reachable leaves, the computing device constructs a query to retrieve data from the database(s). In addition, the server 106 filters the set of data returned from the database(s), either directly within the generated database query, or after the database query has returned results. The query is then executed and results are returned.

To display the returned results, the computing device maps columns in the results to the leaves of the model input. If a "detail set" is associated with a particular leaf provided in the model input, the computing device also includes in the results the detail parameters for the leaf for each row in the results.

Figure 2:
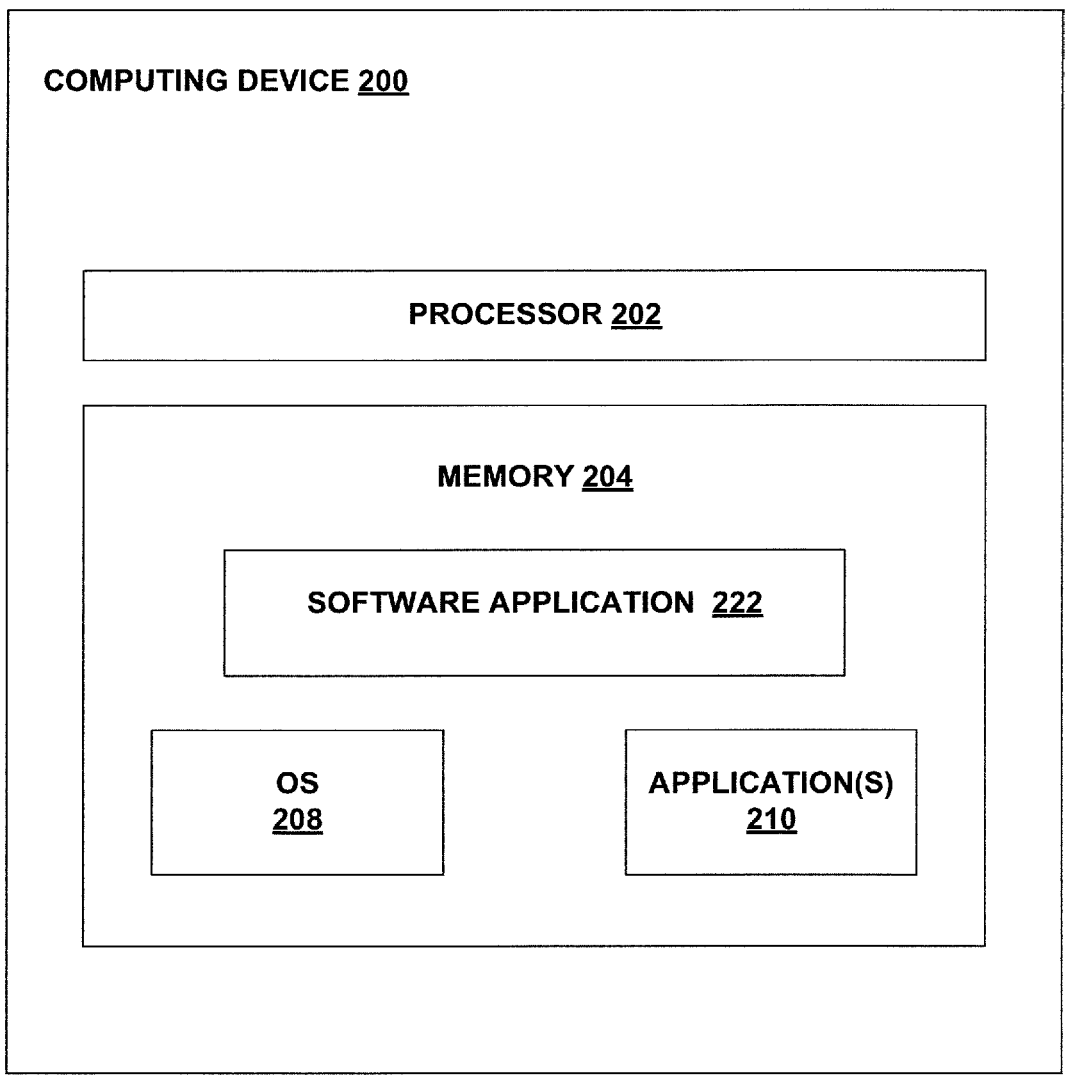
FIG. 2 is a block diagram of the arrangement of components of a computing device configured to query one or more databases, according to an example embodiment.

FIG. 2 is a block diagram of the arrangement of components of a computing device 200 configured to query one or more databases, according to an example embodiment. As shown, computing device 200 includes a processor 202 and memory 204, among other components (not shown). In one embodiment, the computing device 200 comprises the client device 102. In another embodiment, the computing device 200 comprises the server 106.

The memory 204 includes various applications that are executed by processor 202, including installed applications 210, an operating system 208, and software application 222. In embodiments where the computing device 200 comprises the client device 102, the software application 222 comprises a web browser application. In embodiments where the computing device 200 comprises the server 106, the software application 222 comprises a software application configured to receive a model input and generate a database query.

Figure 3:
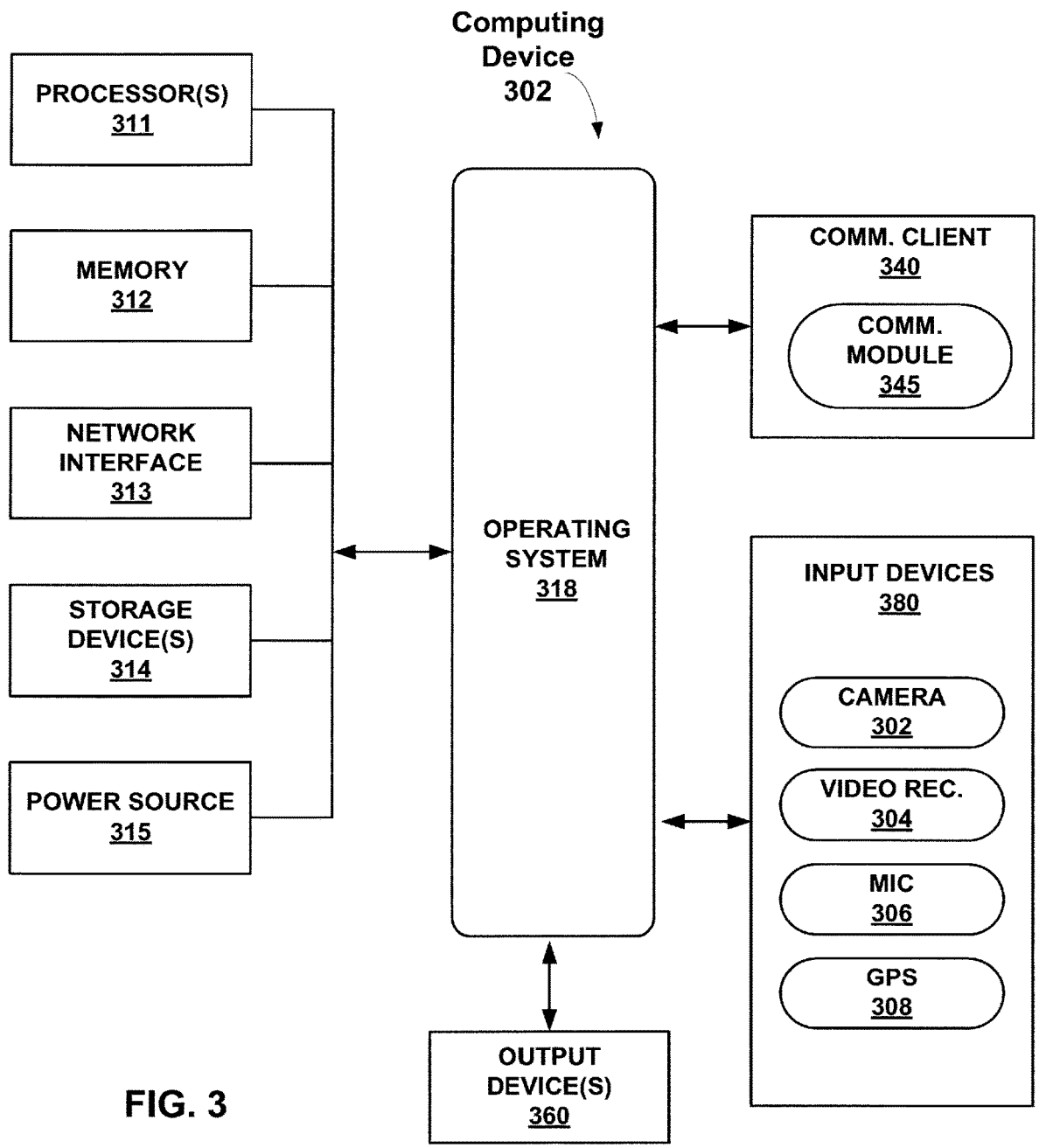
FIG. 3 is a block diagram of example functional components for a computing device, according to one embodiment.

FIG. 3 is a block diagram of example functional components for a computing device 302, according to one embodiment. One particular example of computing device 302 is illustrated. Many other embodiments of the computing device 302 may be used. In one embodiment, the computing device 302 comprises the client device 102. In another embodiment, the computing device 302 comprises the server 106.

In the illustrated embodiment of FIG. 3, the computing device 302 includes one or more processor(s) 311, memory 312, a network interface 313, one or more storage devices 314, a power source 315, output device(s) 360, and input device(s) 380. The computing device 302 also includes an operating system 318 and a communications client 340 that are executable by the client. Each of components 311, 312, 313, 314, 315, 360, 380, 318, and 340 is interconnected physically, communicatively, and/or operatively for inter-component communications in any operative manner.

As illustrated, processor(s) 311 are configured to implement functionality and/or process instructions for execution within computing device 302. For example, processor(s) 311 execute instructions stored in memory 312 or instructions stored on storage devices 314. Memory 312, which may be a non-transient, computer-readable storage medium, is configured to store information within computing device 302 during operation. In some embodiments, memory 312 includes a temporary memory, area for information not to be maintained when the computing device 302 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The computing device 302 uses network interface 313 to communicate with external devices via one or more networks, such server 106 and/or database 108 shown in FIG. 1. Network interface 313 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the computing device 302 uses network interface 313 to wirelessly communicate with an external device, a mobile phone of another, or other networked computing device.

The computing device 302 includes one or more input devices 380. Input devices 380 are configured to receive input from a user through tactile, audio, video, or other sensing feedback. Non-limiting examples of input devices 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in computing device 302. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The computing device 302 includes one or more power sources 315 to provide power to the computing device 302. Non-limiting examples of power source 315 include single-use power sources, rechargeable power sources, and/or power sources developed from nickel-cadmium, lithium-ion, or other suitable material.

The computing device 302 includes an operating system 318, such as the Android® operating system. The operating system 318 controls operations of the components of the computing device 302. For example, the operating system 318 facilitates the interaction of communications client 340 with processors 311, memory 312, network interface 313, storage device(s) 314, input device 180, output device 160, and power source 315.

As also illustrated in FIG. 3, the computing device 302 includes communications client 340. Communications client 340 includes communications module 345. Each of communications client 340 and communications module 345 includes program instructions and/or data that are executable by the computing device 302. For example, in one embodiment, communications module 345 includes instructions causing the communications client 340 executing on the computing device 302 to perform one or more of the operations and actions described in the present disclosure. In some embodiments, communications client 340 and/or communications module 345 form a part of operating system 318 executing on the computing device 302.

FIG. 4 is a conceptual diagram of one or more database tables 402, 404, 406, according to an example embodiment. As shown, three database tables are illustrated, tables 402, 404, 406. Table 402 represents "users" and includes columns for name and email. Table 404 represents "orders" and includes columns for date and user_id. Table 406 represents "order_items" and includes columns for order_id, item_name, and cost. The tables 402, 404, 406 may be stored in one or more databases. As described, according to various embodiments, the databases can be relational databases, non-relational databases, file-based databases, and/or non-file-based databases, among others. The tables shown in FIG. 4 are merely examples used to illustrate embodiments of the disclosure and in no way limit the scope of the disclosure.

Figure 5:
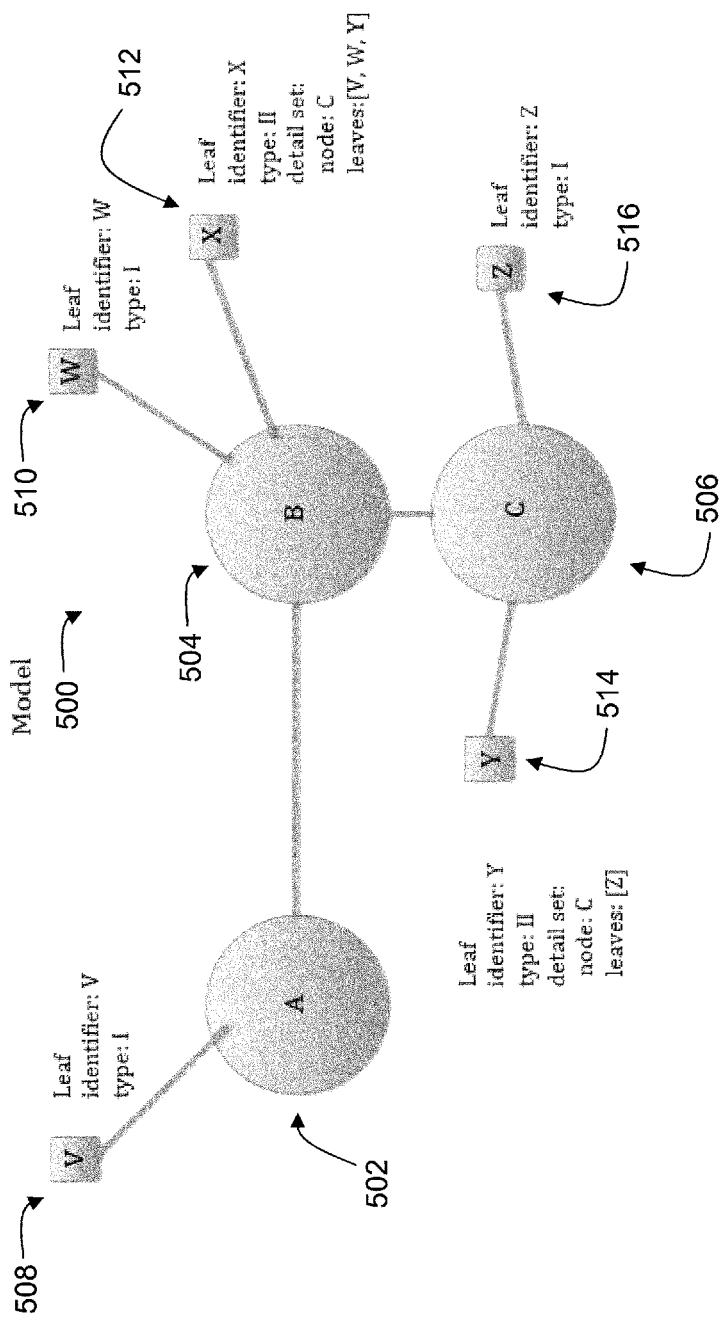
FIG. 5 is a conceptual diagram illustrating a model including nodes and leaves that represents one or more database tables, according to an example embodiment.

FIG. 5 is a conceptual diagram illustrating a model 500 including nodes and leaves that represents one or more database tables, according to an example embodiment. As shown, the model 500 includes nodes 502, 504, 506 and leaves 508, 510, 512, 514, 516. In one example, node 502 corresponds to table 402 in FIG. 4, node 504 corresponds to table 404 in FIG. 4, and node 506 corresponds to table 406 in FIG. 4. Node 502 is connected to node 504. Node 504 is also connected to node 506. The model 500 is represented by a model file. The nodes 502, 504, 506 are represented as separate node files. Examples of a model file and node files are illustrated in Appendix A and are described in greater detail herein.

Node 502 is associated with leaf 508, node 504 is associated with leaves 510, 512, and node 506 is associated with leaves 514, 516. Each leaf includes a leaf identifier and leaf type. Optionally, a leaf can also include a detail set. The leaf identifier is a character string that uniquely identifies the leaf in the model 500. The leaf type corresponds to a data type of the data associated with the leaf. According to one embodiment, the leaf type can be either a first type (also referred to herein as "Type I") or a second type (also referred to herein as "Type II").

A Type I leaf, as used herein, is a leaf type, that when included in a model input, groups the results so that entries with the same value for that leaf are grouped into a single entry in the results. When more than one Type I leaf are included in a model input, the results are grouped so that each row of the results table correspond to aggregated results that have the same value for each tuple of the Type I leafs. A Type II leaf, as used herein, is a leaf type, that when included in a model input, results in an aggregate function being applied to the query and returned as a separate column in the results output. Examples of model inputs with Type I and Type II leaves are provided below for illustration.

Figure 6:
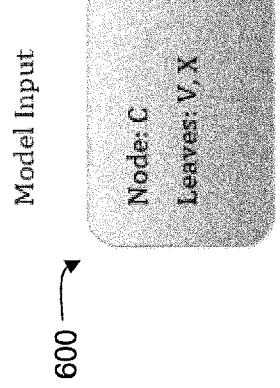
FIG. 6 is a conceptual diagram illustrating a model input for querying one or more databases associated with the model in FIG. 5, according to an example embodiment.

FIG. 6 is a conceptual diagram illustrating a model input 600 for querying one or more databases associated with the model 500 in FIG. 5, according to an example embodiment. As shown, the model input 600 includes selection of a starting node "C," corresponding to node 506 in FIG. 5, and two leaves "V" and "X," corresponding to leaves 508 and 512 in FIG. 5, respectively.

Figure 7:
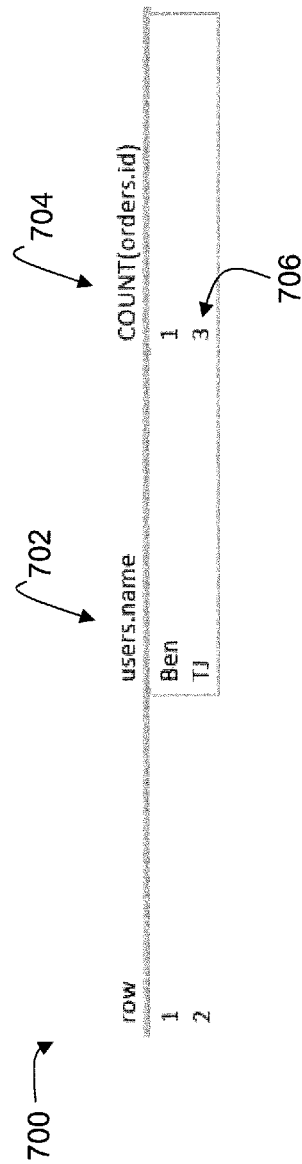
FIG. 7 is a conceptual diagram illustrating a results output for querying one or more databases associated with the model input of FIG. 6, according to an example embodiment.

FIG. 7 is a conceptual diagram illustrating a results output 700 for querying one or more databases associated with the model input 600 of FIG. 6, according to an example embodiment. As shown, the results output 700 includes two rows, row 1 and row 2, and two columns 702, 704.

As described, the model input 600 includes a Type I leaf, leaf "V," corresponding to leaf 508 in FIG. 5. The results of the query are aggregated so that each result that has the same value for leaf 508 is grouped into a single row in the results output 700. In the example shown, the user with name "TJ" completed three orders (see, table 404 in FIG. 4). Each of the three orders completed by TJ is grouped into a single row (i.e., row 2) in the results output 700. The aggregated groups for leaf 508 are shown in column 702 in the results output 700.

In addition, the model input 600 includes a Type II leaf, leaf "X," corresponding to leaf 512 in FIG. 5. Leaf 512 is associated with a count of orders. In the results output 700, a numerical count is displayed in column 704 corresponding to the count of orders for each row. As shown, the rows are organized by users (i.e., by unique values of leaf 508) and column 704 displays the order count for each user.

As an example, when the databases are relational databases that can be queried by SQL (Structured Query Language) queries, the generated SQL query based on the model input 600 may be:

SELECT users.name, COUNT(orders.id) FROM order_items LEFT JOIN orders ON order_items.id=orders.id LEFT JOIN users ON orders.user_id=users.id WHERE users.name="TJ" GROUP BY users.name A more detailed explanation of how a server generates the above SQL query based on the model input is described in greater detail below.

In some embodiments, the results output can be sorted based on certain leaves. For example, if the results output includes a "name" column, the results output can be sorted by the name column. In one embodiment, an algorithm is used for determining the default sort order. For example, if the results output includes a column that represents a date or a time in the database, then a sort is performed by that field, descending. If no date or time is included in the results output, but one or more numeric measures are included in the results output, then a sort is performed by one of the numeric measures (e.g., the first one), descending. If no date or time or numeric measures are included in the results output, the a sort is performed by the first field selected for model input.

Also, in some embodiments, certain Type II leaves cannot be queried from certain starting nodes. Doing so may result in incorrect data by way of improper aggregation. The limitations on which leaves cannot be queried from a certain starting node can be inferred based on the aggregate function used in the SQL fragment. For example, if the leaf uses a SUM aggregate function, the sum is only made available if the querying is from the starting node that the leaf is attached to, and not from a different node that joins that node with the starting node. For example, using an example of a model for flight information, if an "airports" node had a Type II leaf that calculated the sum of airports, this leaf would be available for model input when the model input starting node is the airports node, but not when the model input node is another node, such as a flights node, even though the flights node is joined/connected to the airports node.

As described in greater detail herein, a user of the database querying system can "drill" further down into the results output by selecting a particular result in the results output. Selecting a result generates another database query. For example, a user may select result 706 corresponding to the number "3," which represents the three orders placed by user TJ.

Figure 8:
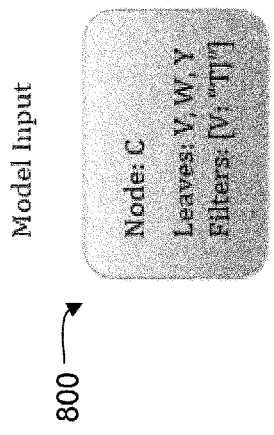
FIG. 8 is a conceptual diagram illustrating a model input for querying one or more databases associated with the model in FIG. 5 by selecting a result from the results output, according to an example embodiment.

FIG. 8 is a conceptual diagram illustrating a model input 800 for querying one or more databases associated with the model 500 in FIG. 5 by selecting a result 706 from the results output 700, according to an example embodiment. The model input 800 is generated based on the "detail set" of the selected leaf (i.e., leaf 512) in the column for the selected result 706. See FIG. 5, leaf 512, which is associated with a detail set identifying node C and leaves V, W, Y.

As shown, the model input 800 includes selection of a single node "C," corresponding to node 506 in FIG. 5, three leaves "V," "W," and "Y," corresponding to leaves 508, 510, and 514 in FIG. 5, respectively, and a filter for leaf "V" (i.e., leaf 508) with a value of "TJ." Node 506 is selected as the starting node for the model input 800 based on the detail set of the selected leaf (i.e., leaf 512). Leaves 508, 510, and 514 are selected as the leaves of the model input 800 since leaves 508, 510, and 514 are included in the "detail set" of the selected leaf (i.e., leaf 512). Also, the model input 800 is filtered by the values each of the Type I leaves corresponding to the selected row of the result 706. In this example, result 706 is associated with row 2 of the results output 700. Each row of the results output 700 is associated with one Type I leaf (i.e., leaf 508, corresponding to users.name). The model input 800 that is generated when the result 706 is selected for "drilling" is filtered by the value of the leaf 508 (i.e., in row 2 of the results output), in this example, having a value of "TJ."

Figure 9:
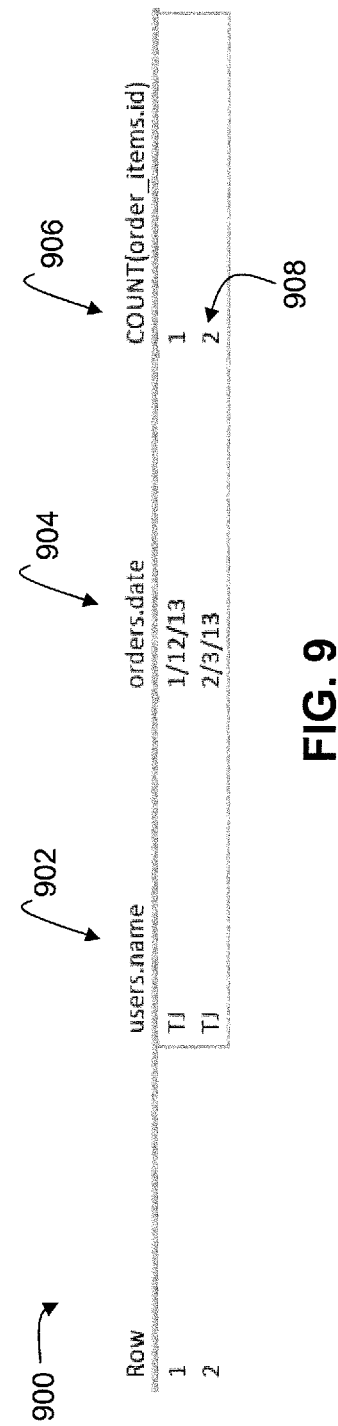
FIG. 9 is a conceptual diagram illustrating a results output for querying one or more databases associated with the model input of FIG. 6 after selecting a result from a previous results output, according to an example embodiment.

FIG. 9 is a conceptual diagram illustrating a results output 900 for querying one or more databases associated with the model input 800 of FIG. 8 after selecting a result 706 from a previous results output 700, according to an example embodiment. As shown, the results output 900 includes two rows, row 1 and row 2, and three columns 902, 904, 906.

The model input 800 includes two Type I leaves, leaves V and W, corresponding to leaves 508 and 510, respectively, in FIG. 5. The results are aggregated so that each result that has the same value for both leaves 508 and 510 is grouped into a single row in the results output 900. In the example shown, the user with name "TJ" completed three orders (see, table 404 in FIG. 4). One of the orders was completed on Jan. 12, 2013 and two orders were completed on Feb. 3, 2013. As shown, the three orders completed by TJ are grouped into two rows in the results output 900 organized by each unique combination of users.name (i.e., column 902) and orders.date (i.e., column 904). The aggregated groups for leaf 508 are shown in column 702 in the results output 700.

In addition, the model input 800 includes one Type II leaf, leaf "Y," corresponding to leaf 514 in FIG. 5. Leaf 514 is associated with a count of "order_items.id." In the results output 900, a numerical count is displayed corresponding to the count of order_items for each row. In the example shown, one order was completed by TJ on Jan. 12, 2013 and two orders were completed by TJ on Feb. 3, 2013, as shown in column 906.

As an example, when the databases are relational databases that can be queried by SQL (Structured Query Language) queries, the generated SQL query based on the model input 800 may be:

SELECT users.name, orders.date, COUNT(order_items.id) FROM order_items LEFT JOIN orders ON order_items.id=orders.id LEFT JOIN users ON orders.user_id=users.id WHERE users.name="TJ" GROUP BY users.name, orders.date As described, a user of the database querying system can "drill" down further into the results data by selecting a result in the results output 900, similar to drilling down into the results output 700 in FIG. 7. Selecting a result generates another database query. For example, a user may select result 908 corresponding to the number "2," which represents the two orders placed by user TJ on Feb. 3, 2013.

Figure 10:
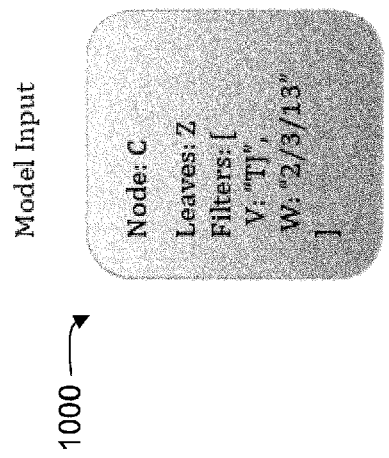
FIG. 10 is a conceptual diagram illustrating a model input for querying one or more databases associated with the model in FIG. 5 by selecting a result from the results output, according to an example embodiment.

FIG. 10 is a conceptual diagram illustrating a model input 1000 for querying one or more databases associated with the model 500 in FIG. 5 by selecting a result 908 from the results output 900, according to an example embodiment. The model input 1000 is generated based on the "detail set" of the selected leaf (i.e., leaf 514) corresponding to the column for the selected result 908. See FIG. 5, leaf 515, which is associated with a detail set identifying node C and leaf Z.

As shown, the model input 1000 includes selection of a single node "C," corresponding to node 506 in FIG. 5, one leaf "Z," corresponding to leaf 516 in FIG. 5, a filter for leaf "V" (i.e., leaf 508) with a value of "TJ," and a filter for leaf "W" (i.e., leaf 510) with a value of "2/3/13." Node 506 is selected as the starting node for the model input 1000 based on the detail set of the selected leaf (i.e., leaf 514). Leaf 510 is selected as a leaf of the model input 1000 since leaf 510 is included in the "detail set" of the selected leaf (i.e., leaf 514). Also, the model input 1000 is filtered by the values each of the Type I leaves corresponding to the selected row of the result 908. In this example, result 908 is associated with row 2 of the results output 900. Each row of the results output 900 is associated with two Type I leaves, leaves 508 and 510, corresponding to users.name and orders.date, respectively. The model input 1000 that is generated when the result 908 is selected for "drilling" is filtered by the value of the leaves 508 and 510 in row 2 of the results output 908, i.e., having a values of "TJ" and "2/3/13," respectively.

Figure 11:
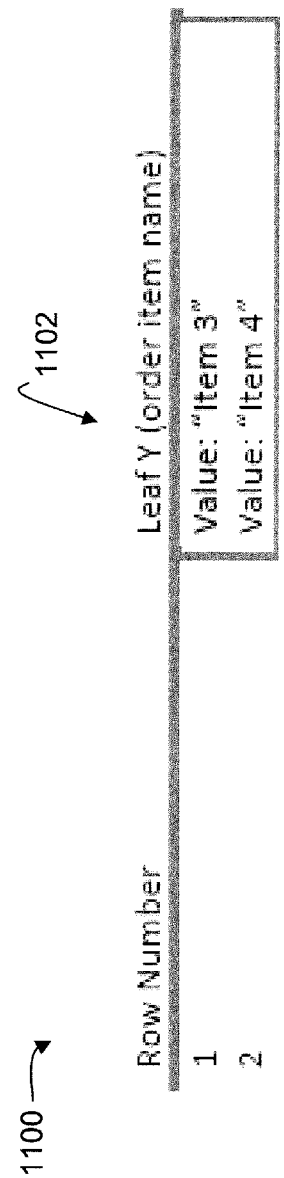
FIG. 11 is a conceptual diagram illustrating a results output for querying one or more databases associated with the model input of FIG. 10 after selecting a result from a subsequent results output, according to an example embodiment.

FIG. 11 is a conceptual diagram illustrating a results output 1100 for querying one or more databases associated with the model input 1000 of FIG. 10 after selecting a result 908 from a subsequent results output 900, according to an example embodiment. As shown, the results output 1100 includes two rows, row 1 and row 2, and one column 1100.

The model input 1000 includes one Type I leaf, leaf Z corresponding to leaf 516 in FIG. 5. The results are aggregated so that each result in the results output 1100 that has the same value for leaf 516 is grouped into a single row in the results output 1100. The results are also filtered by applying the two filters in the model input 1000. As shown, the two orders completed by TJ on Feb. 3, 2013 are grouped into two rows in the results output 1100, organized by each unique item_name (i.e., column 1102).

FIGS. 12-16 illustrate conceptual diagrams of another example model and a corresponding user interface for querying the model and returning results.

Figure 12:
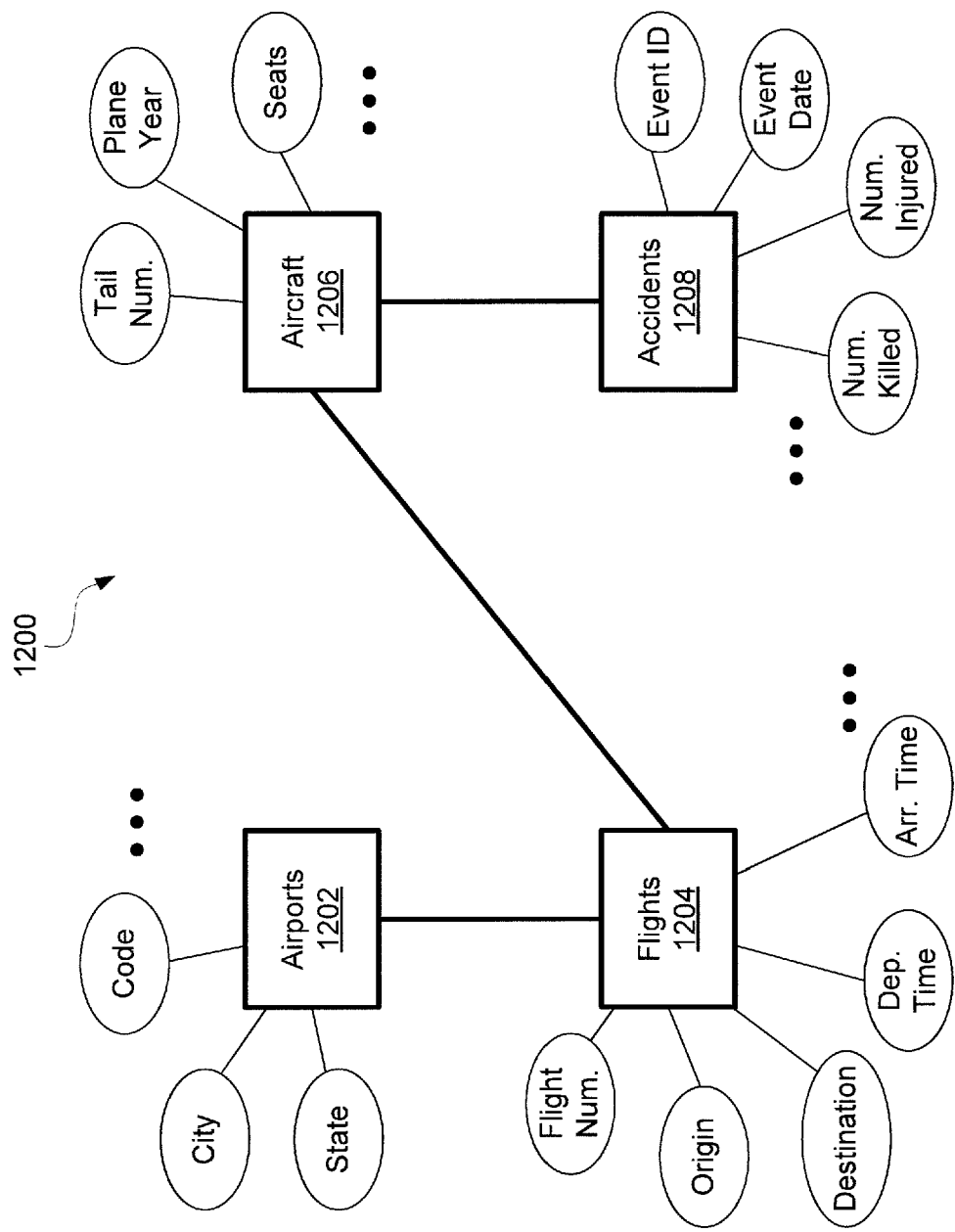
FIG. 12 is a conceptual diagram illustrating a model including nodes and leaves that represents one or more database tables, according to an example embodiment.

FIG. 12 is a conceptual diagram illustrating a model 1200 including nodes 1202, 1204, 1206, 1208 and leaves that represents one or more database tables, according to an example embodiment. In this example, the model 1200 represents flight data organized by four database tables corresponding to nodes for airports 1202, flights 1204, aircraft 1206, and accidents 1208. Each node is associated with a plurality of leaves. Some of the leaves are Type I leaves and some of the leaves are Type II leaves. Also, the airports node 1202 is connected to the flights node 1204, which is connected to the aircraft node 1206, which is connected to the accidents node 1208.

Figure 13:
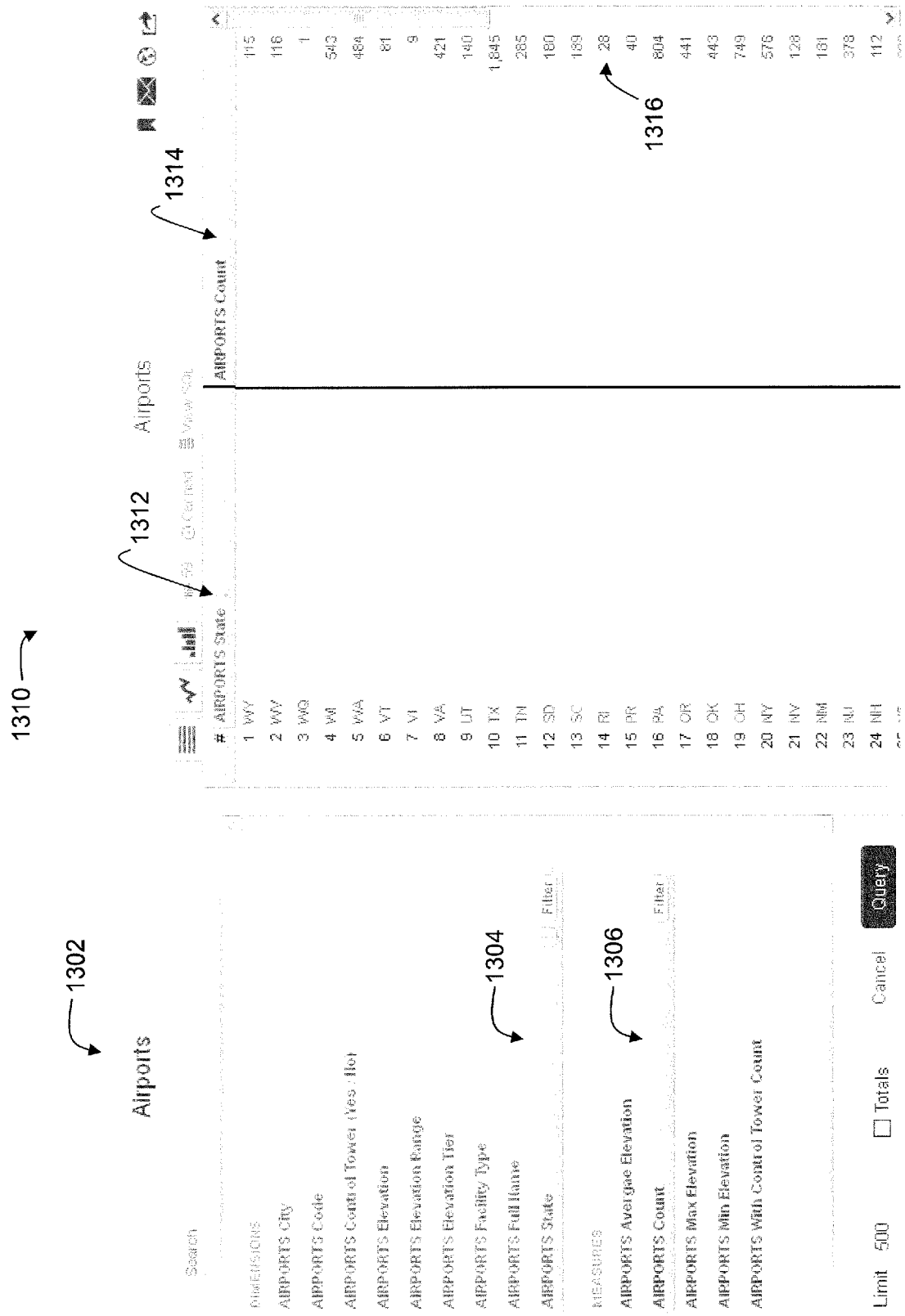
FIG. 13 is a conceptual diagram illustrating user interface for selecting a model input for querying one or more databases associated with the model in FIG. 12, according to an example embodiment.

FIG. 13 is a conceptual diagram illustrating user interface for selecting a model input for querying one or more databases associated with the model 1200 in FIG. 12, according to an example embodiment. As shown, the airports node 1302 is selected as the starting node for the model input. Selection of the starting node can be done via any technically feasible mechanism, including a drop-down list of available starting nodes. When the airports node 1302 is selected, a plurality of leaves are displayed that can be selected for the model input.

In FIG. 13, leaves for AIRPORTS_state and AIRPORTS_count are selected. A query to the databases can be generated and executed by selecting the query button 1308. The results of the query are shown in results output 1310. The results output 1310 includes a column for each of the selected leaves of the model input, i.e., leaves for AIRPORTS_state (column 1312 in results output 1310) and AIRPORTS_count (column 1314 in results output 1310). In one example, AIRPORTS_state is a Type I leaf, so the results in the results output 1310 are organized by grouping the results into a separate row for each unique value of AIRPORTS_state. In this example, AIRPORTS_count is a Type II leaf, which calculates a count of the airports in each state.

As described herein, a user can further "drill" into the results output 1314 by selecting a result. In one example, a user may select result 1316, corresponding to the number "28" for the number of airports in the state of RI (Rhode Island).

FIG. 14 is a conceptual diagram illustrating a user interface for displaying a results output 1400 for querying one or more databases associated with the model input of FIG. 13 after selecting a result 1314 from a previous results output 1310, according to an example embodiment. The selected leaf from the previous results output 1310 (i.e., AIRPORTS_count) is associated with a particular detail set. A model input is generated where the selected node corresponds to the node included in the detail set and the leaves of the model input are the leaves of the detail set. The results are filtered by the values of each Type I leaf in the row of the selected result (i.e., filter by the AIRPORT_state=RI).

As shown in FIG. 14, a subsequent results output 1400 is displayed that includes columns corresponding the leaves of the detail set of the previously selected result, filtered by the values of each Type I leaf in the row of the selected result. Thus, the results output 1400 displays the detail set for each of the 28 airports in RI.

Figure 15:
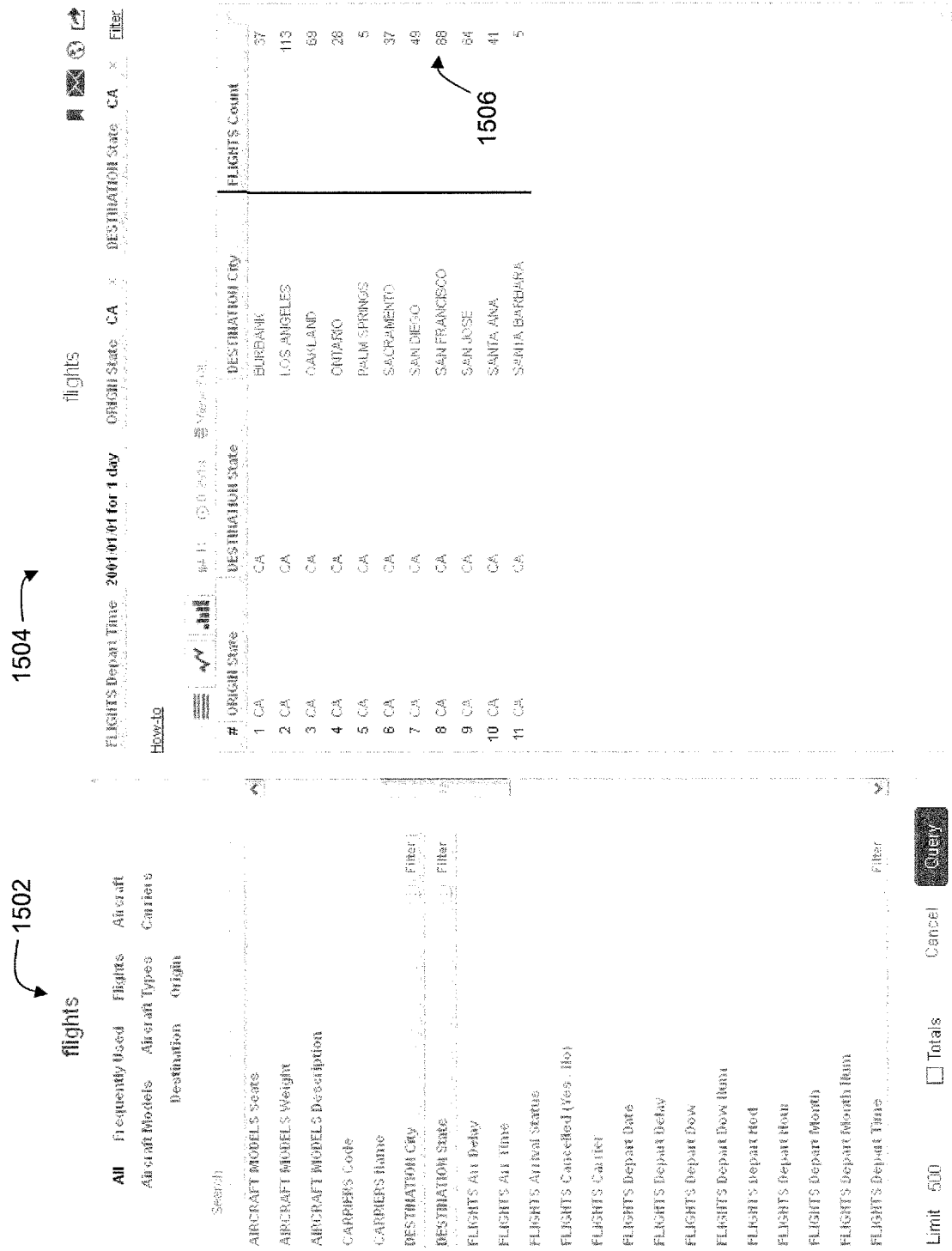
FIG. 15 is a conceptual diagram illustrating yet another user interface for selecting a model input for querying one or more databases associated with the model in FIG. 12, according to an example embodiment.

FIG. 15 is a conceptual diagram illustrating yet another user interface for selecting a model input for querying one or more databases associated with the model 1200 in FIG. 12, according to an example embodiment. In FIG. 15, the flights node 1502 is selected as the starting node. Selection of the starting node can be done via any technically feasible mechanism, including a drop-down list of available starting nodes. When the flights node 1502 is selected, a plurality of leaves are displayed that can be selected for the model input.

Leaves for ORIGIN_state, DESTINATION_state, DESTINATION_city, and FLIGHT_count are selected for the model input. In FIG. 15, filters for FLIGHT_depart_date=01/01/2001, ORIGIN_state=CA, and DESTINATION_state=CA are also added to minimize the number of results for clarity.

A query to the databases can be generated and executed by selecting the query button. The results of the query are shown in results output 1504. The results output 1504 includes a column for each of the selected leaves of the model input, i.e., leaves for ORIGIN_state, DESTINATION_state, DESTINATION_city, and FLIGHT_count. In one example, each of ORIGIN_state, DESTINATION_state, and DESTINATION_city is a Type I leaf, so the results in the results output 1504 are organized by grouping the results into a separate row for each unique value-triplet of ORIGIN_state, DESTINATION_state, and DESTINATION_city. In this example, AIRPORTS_count is a Type II leaf, that calculates a count of the airports in each row of the results output.

As described herein, a user can further "drill" into the results output 1504 by selecting a result. In one example, a user may select result 1506, corresponding to the number "88" for the number of flights having origin state "CA" (California), destination state "CA," and destination city "San Francisco."

Figure 16:
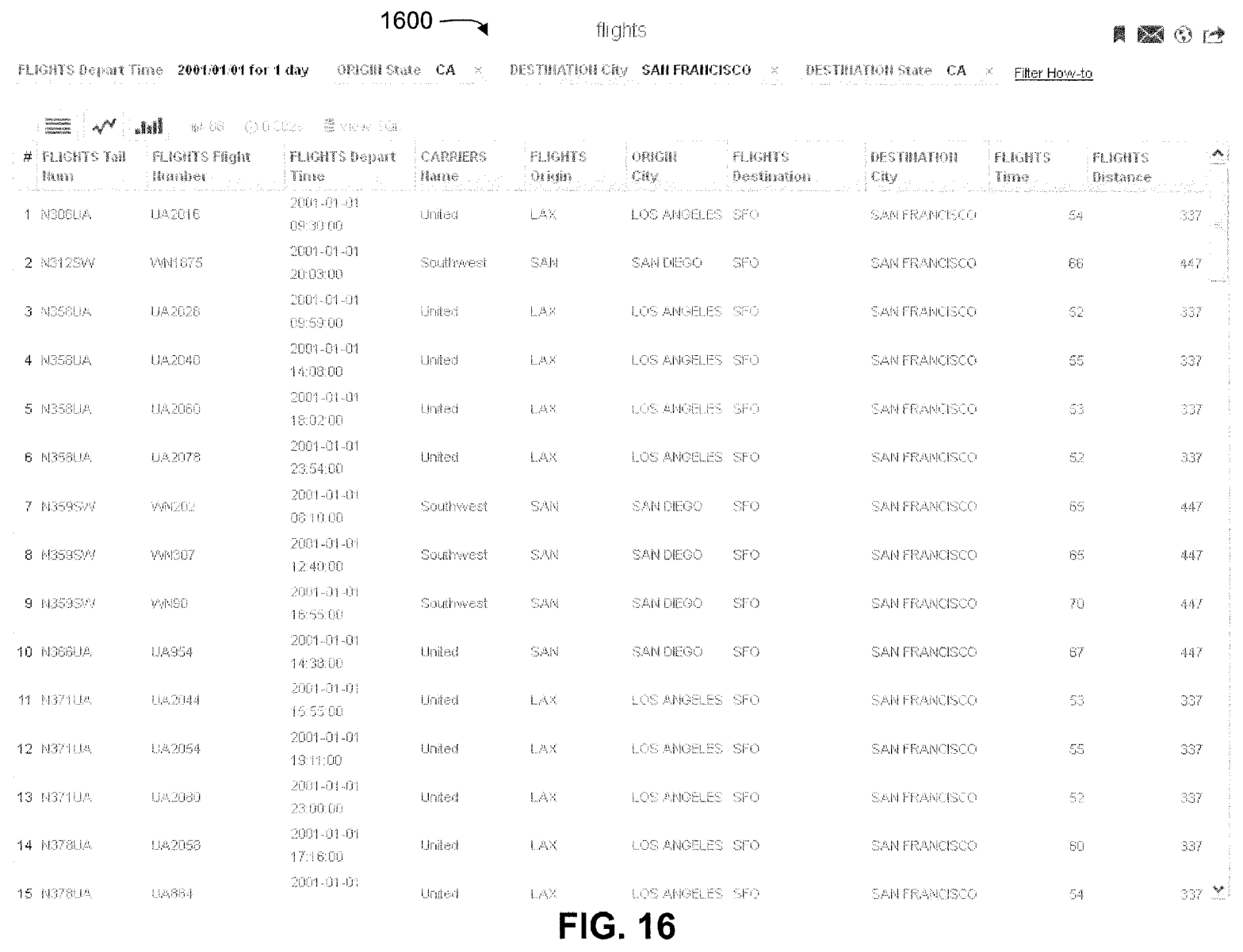

FIG. 16 is a conceptual diagram illustrating a user interface for displaying a results output 1600 for querying one or more databases associated with the model input of FIG. 15 after selecting a result 1506 from a previous results output 1504, according to an example embodiment. The selected leaf from the previous results output 1504 (i.e., FLIGHTS count) is associated with a particular detail set. A model input is generated where the selected node corresponds to the node included in the detail set and the leaves of the model input are the leaves of the detail set. The results are filtered by the values of each Type I leaf in the row of the selected result 1506 (i.e., filter by origin state "CA," destination state "CA," and destination city "San Francisco").

As shown in FIG. 16, a subsequent results output 1600 is displayed that includes columns corresponding the leaves of the detail set of the previously selected result 1506, filtered by the values of each Type I leaf in the row of the selected result 1506. Thus, the results output 1600 displays the detail set for each of the 88 flights that had a destination city of "San Francisco" that had an origin state "CA" and destination state "CA."

Figure 17:
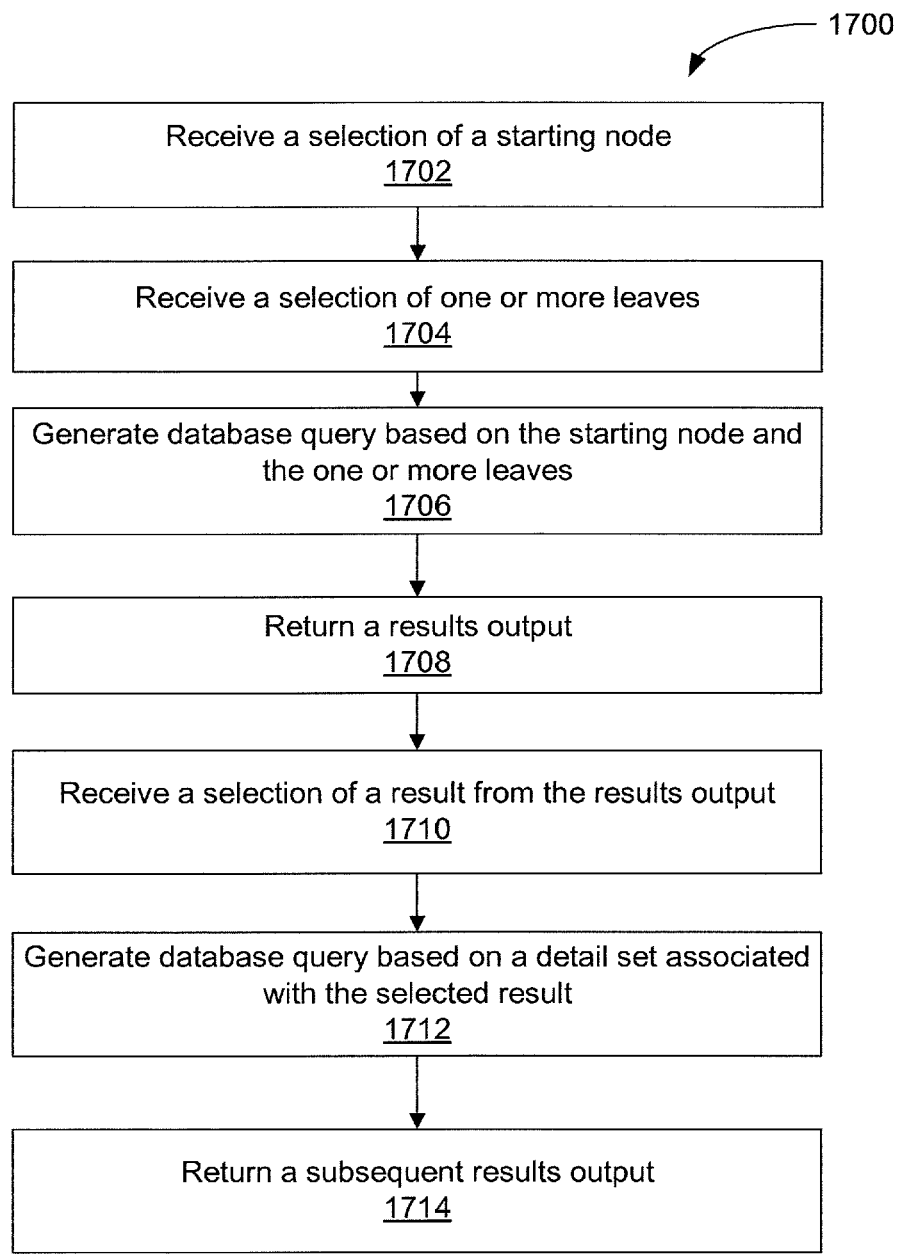
FIG. 17 is a flow diagram for querying a database, according to an example embodiment.

FIG. 17 is a flow diagram for querying a database, according to an example embodiment. Persons skilled in the art will understand that even though the method 1700 is described in conjunction with the systems of FIGS. 1-3, any system configured to perform the method stages is within the scope of embodiments of the disclosure.

As shown, the method 1700 begins at step 1702, where a server receives a selection of a starting node. In one embodiment, the server comprises server 106 in FIG. 1. The selection may be made via a user interface displayed on a client device, such as client device 102, and communicated to the server over the data network 104. At step 1704, the server receives a selection of one or more leaves. The starting node and the one or more leaves may be received by the server as a "model input" associated with a model for one or more interconnected nodes corresponding to database tables.

At step 1706, the server generates database query based on the starting node and the one or more leaves. Generating a the database query is described in greater detail in FIG. 18.

At step 1708, a database returns results to the server and the server returns a results output to the client device. Each column of the results output corresponds to one of the one or more selected leaves. Also, for each leaf that is a Type I leaf, the results are aggregated by unique values for each tuple of Type I leafs. For example, if there are two Type I leaves, the results are aggregated according to unique value pairs for the two Type I leaves. Each aggregated tuple of Type I leaves is returned as a separate row of the results output. For each leaf that is a Type II leaf, an aggregate calculation is performed and returned for each row of the results output.

At step 1710, the server receives a selection of a result from the results output, also referred to herein as "drilling" on a returned result. In one embodiment, the selection is of a Type II result.

At step 1712, the server generates database query based on a detail set associated with the selected result. As described, each Type II leaf may be associated with a detail set that includes a starting node and one or more leaves. A database query is generated using the starting node of the detail set and the one or more leaves of the detail set. The database query is also filtered by the values of each Type I leaf in the row of the selected result.

At step 1714, the server returns a subsequent results output. Each column of the results output corresponds to one of the leaves of the detail set. Also, for each Type I leaf, the results are aggregated by unique values for each tuple of Type I leafs. Each aggregated tuple of Type I leaves is returned as a separate row of the subsequent results output. For each leaf that is a Type II leaf, an aggregate calculation is performed and returned for each row of the subsequent results output.

In this manner, a user can "drill" down into a returned results to receive further refined data.

Model Creation and Model Files

As described, generating a database query is based on a model of interconnected nodes that have corresponding leaves. The model can be defined by a model file that identifies the relationships between nodes in the model. An example of a model file is shown on page A1 of the Appendix to the specification.

The model may include one or more nodes. In an example of a model that represents flight data, the model may include nodes of airports, aircraft, accidents, and flights. Each node is represented as a separate node file. Examples of node files for airports, aircraft, accidents, and flights are shown in the Appendix (i.e., pages A2-A5 for an accident node file, pages A6-A8 for an aircraft node file, pages A9-A10 for an airports node file, and pages A11-A16 for a flights node file). In one example implementation, the model file and node files are implemented as files using the YAML (Yet Another Markup Language) syntax. In other embodiments, a model can be stored in any format suitable for data storage, for example, the model can be stored in a database.

In one implementation, the nodes in the model are referenced in the model syntax using the terms "view" and "base_view." Each view (i.e., node) includes a set of leaves, joins, and sets. In one implementation, the leaves in the model are referenced in the model syntax using the term "field." The leaves can be of Type I or Type II. Type I leaves are also referred to as "dimesions" and correspond to groupable fields that can be either an attribute of a database table (i.e., have some direct physical presence in a database table) or can be a computed from values in the database table. Type II leaves are also referred to as "measures" and corresponds to leaves implemented with an aggregate function, such as COUNT( . . . ), SUM( . . . ), AVG( . . . ), MIN( . . . ) or MAX( . . . ), for example.

Joins define a connection between one node and other nodes. Sets define lists of leaves for a particular node. Example sets include:
  ignore—the set of fields to ignore (not use in any context),
  measures—the set of fields to use as measures,
  base only—the set of fields to be included in an base-view context, and
  admin—fields to include when the user has admin privileges.

As described in greater detail herein, the node and model files may include query fragments used to generate a database query from a model input. In one implementation, the database query is an SQL (Structured Query Language) query and the query fragments are SQL fragments.

Figure 19:
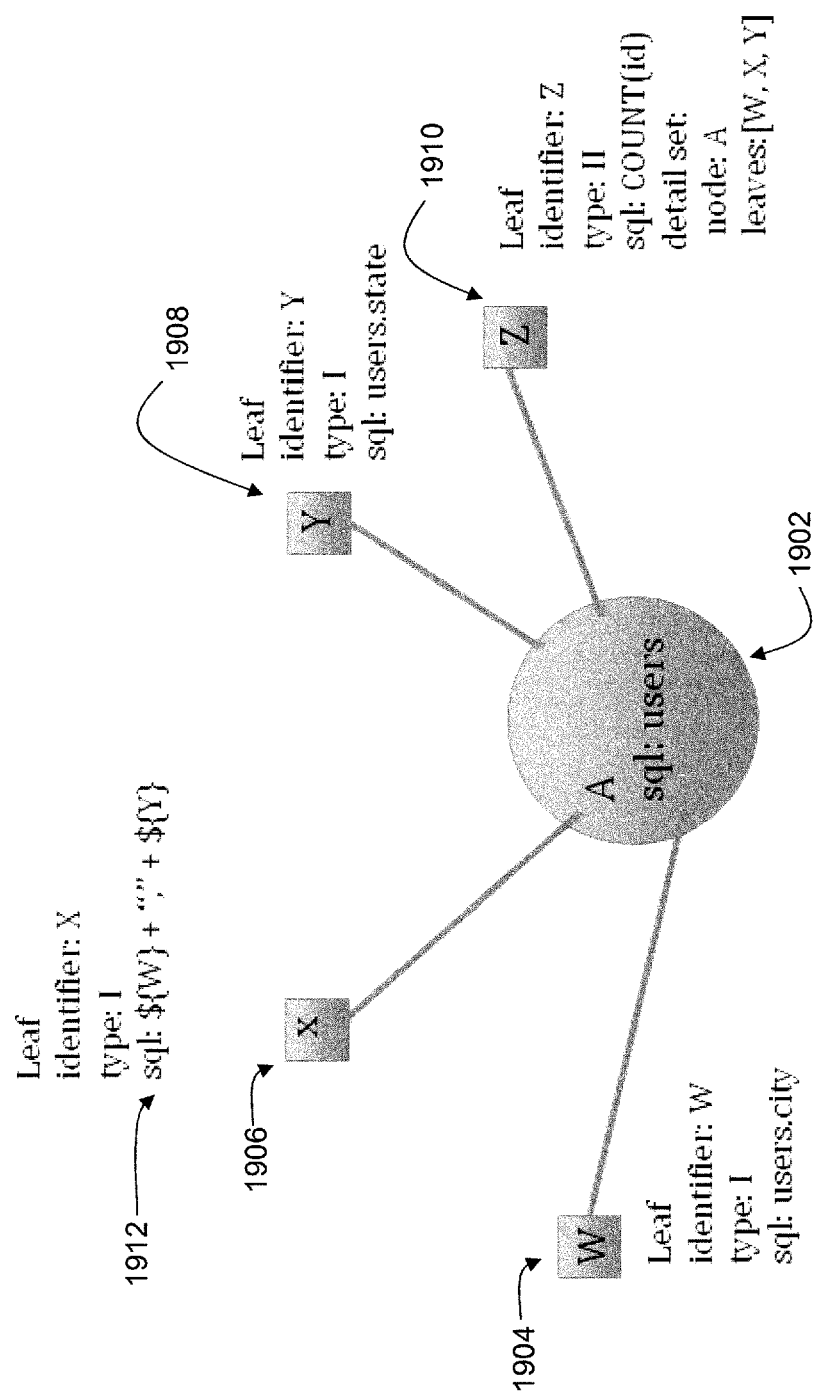
FIG. 19 a conceptual diagram illustrating a model including a one node and a plurality of leaves, according to an example embodiment.

In some embodiments, if a leaf A can reach another leaf B in the model, leaf A can use a SQL fragment from leaf B as part of its own SQL fragment. FIG. 19 a conceptual diagram illustrating a model including a one node 1902 and a plurality of leaves 1904, 1906, 1908, 1910, according to an example embodiment. In this example, the syntax "S {leaf identifier}" is used to reference two leaves (i.e., W and Y) in a SQL fragment 1912 of another leaf, i.e., leaf X. In one embodiment, including leaf X in a model input would result in the following SQL query being generated:
  SELECT users.city+","+users.state AS X FROM users GROUP BY X;
Similarly, selecting both leaves W and X in the model input would result in the following SQL query being generated:
  SELECT users.city AS W, users.city+","+users.state AS X FROM users GROUP BY W,X;

This can be extended to any level of referencing of fields. For example, a field C can include SQL fragments from a field B, which includes SQL fragments from a field A. SQL fragment referencing in this manner can also occur between Type I and Type II leaves, and from Type II to Type II as well.

In addition, in some embodiments, some leaves can be automatically promoted to Type II from Type I. Knowing that a leaf can reference fragments from other leaves means that we can infer something about the type of a leaf based on other leaves that are used to build the leaf. In one implementation, when any leaf A is of Type II, any leaf B that references leaf A can be inferred to also be of Type II. As described, a leaf that is of Type II uses an aggregate function and therefore includes the aggregation of a group of values for a given row in a results output. As such, it is not possible to use a SQL fragment from a Type II leaf in a Type I leaf, because the Type I leaves result in data from a single row in the data store. This means that we can infer, because a leaf B references a Type II leaf A, that leaf B is also a Type II leaf.

One unique aspect of using models and associated nodes, as described herein, is that data can be queried by selecting leaves from different nodes for the model input. Different nodes can be interconnected using the following syntax and examples:

A node can be connected to another node with the 'join' statement. Appendix A, at page A12, line 53, is an example. The join statement describes the one-way connection from one node to another by using join syntax, where 'join' describes an identifier for the join (used to display fields names with the join identifier in front, such as (DESTINATION_city), 'from' is a node identifier, and 'sql_on' is the sql fragment required to join the node. The appendix example is more complex, because it employs another strategy we use to template views—'$$', which means the current node, in this case 'airports'. This syntax allows us to join one node into another multiple times, but is not required to describe a sql_on fragment. Optionally, a fields set can be used to determine which fields should be accessible from the joined node.

In addition, as described, each node can be associated with one or more leaves. The leaves can be of Type I or Type II, as described. Also, a "detail set" can be associated with Type II leaves, such that a subsequent query is generated by selecting a particular Type II result (i.e., "drilling").

In one embodiment, all leaves are Type I by default, and only become Type II leaves when they are specified to be a subtype of Type II (such as a count distinct type, e.g., at page A9, line 26 of Appendix A), when they are placed into the 'measures' set (not shown in Appendix A), or when the SQL fragment references another Type II leaf (e.g., page A4, line 129). Detail sets are defined using the detail attribute on a leaf. The attribute can simply be an array of fields (not shown in Appendix A). An example would be 'detail: [field1, field2, field3]'), or can be a reference to another set defined elsewhere in the node (e.g., page A9, line 29 references page A9, line 8 as its detail set).

Query Generation from a Model Input

As described above in FIG. 17, i.e., at steps 1706 and 1712, a database query can be generated based on a selection of a starting node, one or more leaves, and optionally one or more filters. Using SQL as example, the database query can be generated by executing the following steps shown in FIG. 18.

In one implementation, node connections result in JOIN statements in SQL. In the model input, including leaves that are attached to nodes other than the starting node of the model implies that additional joins are created in the generated SQL statement. This is accomplished by adding a SQL fragment for each node connection in the particular node file. An example is shown at page A12, line 53 of Appendix A. Here, we are joining the airport node into the flight node using the sql fragment described in the sql_on attribute, where $$ means the current node.

FIG. 18 is a flow diagram of method steps for generating a database query from a model input, according to an example embodiment. In this example embodiment, the generated query is a SQL query. Persons skilled in the art will understand that even though the method 1800 is described in conjunction with the systems of FIGS. 1-3, any system configured to perform the method stages is within the scope of embodiments of the disclosure.

As shown, the method 1800 begins at step 1802, where a server receives a model input. In one embodiment, the server comprises server 106 in FIG. 1. The model input includes a starting node, one or more leaves, and optionally one or more filters. The selection of the starting node, the one or more leaves, and the optional one or more filters may be made via a user interface displayed on a client device, such as client device 102, and communicated to the server over the data network 104.

At step 1804, the server generates five (5) data sets to store SQL fragments. The data sets may correspond the following five SQL commands: SELECT, JOIN, WHERE, GROUP BY, and HAVING.

At step 1806, the server selects a leaf from the model input 1806. At step 1808, the server adds SQL fragment to one or more data sets based on the leaf data. As described above, the leaf data may include various information about the leaf, such as a leaf identifier, an indication of whether the leaf is a Type I leaf or a Type II leaf, a detail set for the leaf, and/or an indication of nodes from which the leaf is accessible.

In one example implementation, if the leaf is not reachable from the starting node of the model input, then the leaf is ignored and the method 1800 proceeds to step 1810. If the leaf is reachable from the starting node, then the server adds the SQL fragment "{leaf SQL fragment} AS {leaf identifier}" to the SELECT data set. If the leaf is a Type I leaf, then the server also adds "{leaf identifier}" to the GROUP BY data set. If the leaf is not connected to the staring node, but instead is connected to another node, then the server adds the SQL fragment associated with the node connection in question to the JOIN data set with the following syntax: "LEFT JOIN {node identifier} ON {node connection SQL fragment}" to the JOIN data set. If the leaf has a required_nodes attribute, then for each required_node node, the server adds the SQL fragment associated with the node with the following syntax: "LEFT JOIN {node identifier} ON {node connection SQL fragment}" to the JOIN data set. In some embodiments, node dependency means that leaves can include a new attribute (i.e., a set of nodes), referred to as "required_nodes." When included as a leaf attribute, this attribute specifies that the SQL generated should include a join of the node that the SQL fragment needs in order to function properly.

At step 1810, the server determines whether any filters are included in the model input. If no filters are applied, then the method 1800 proceeds to step 1818. If filters are applied, then the method 1800 proceeds to step 1812.

At step 1812, the server determines whether the leaf is Type I or Type II. If the leaf is Type I, the method 1800 proceeds to step 1814. If the leaf is Type II, the method 1800 proceeds to step 1816.

At step 1814, for a Type I leaf, the server adds the leaf identifier to the WHERE data set by adding the SQL fragment "{leaf identifier}={filter value}" to the WHERE data set. At step 1816, for a Type II leaf, the server adds the leaf identifier to the HAVING data set by adding the SQL fragment "{leaf identifier}={filter value}" to the HAVING data set.

At step 1818, the server determines whether there are any more leaves in the model input to process. If not, the method 1800 proceeds to step 1820. If there are more leaves to process, then the method 1800 returns to step 1806, described above.

At step 1820, the server constructs a SQL query with fragments from the five data sets. In one embodiment, the server constructs the SQL query by starting with a blank statement and performing the following steps:

appending "SELECT"+each value in the SELET data set, comma separated,
appending "FROM"+{node identifier},
appending each value in the JOIN data set,
appending "WHERE"+each value in the WHERE data set, comma separated,
appending "GROUP BY"+each value in the GROUP BY data set, comma separated,
appending "HAVING"+each value in the HAVING data set, comma separated, and
appending a semicolon.

The server then executes the generated SQL query against the one or more databases. The results are returned as a result output, as described above.

Query Killing

One problem often encountered with database queries is that complicated queries can take a very long time to return results. Users can sometimes get frustrated with the long wait time and may close the query input window on the client device. A new query input may then be input by the user and a second database query is sent to the database.

However, in some cases, unbeknownst to the user, the first query may still be executing against the database. This may cause the second query to take a long time to return results, even if the second query is simple. One or more additional queries can be sent from one or more users, further clogging the database.

Figure 20:
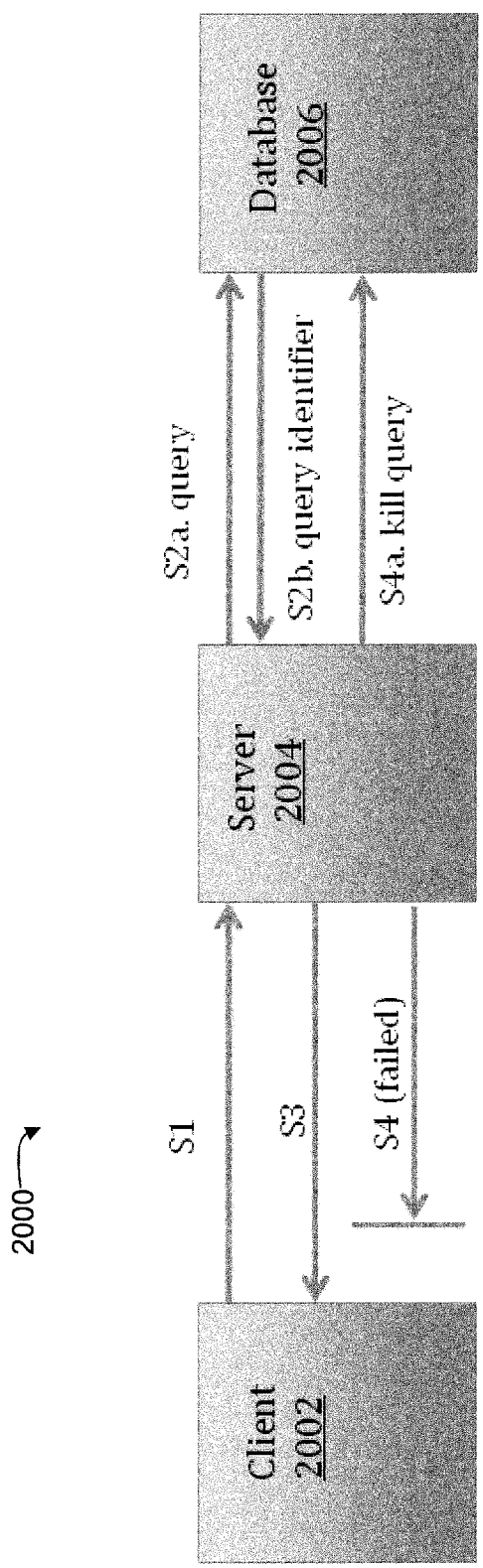
FIG. 20 a conceptual diagram illustrating a technique for canceling a query, according to an example embodiment.

Embodiments of the disclosure provide a technique for automatically canceling certain queries, or "query killing." FIG. 20 a conceptual diagram illustrating a technique for canceling a query, according to an example embodiment. As shown, a system 2000 includes a client 2002, a server 2004, and a database 2006. The client 2002 is a software application for retrieving and displaying information from the server 2004. The server executes also executes a software application, which is configured to construct a database query. The database 2006 is where the query is executed.

In one embodiment, a request to execute a model query is transmitted by the client 2002 to the server 2004 via a network connection. In some implementations, a user in a browser application select a node and one or more leaves as model input, selects for a query to be executed, and then waits on a web page of the browser application for the results output to return from the database 2006. As described, some database queries, because of the nature of the data or the construction of the query, require excessive processing power and/or memory to execute. Often these same queries result in reduced performance for other concurrent queries.

In one implementation, a method for canceling the query includes the steps shown in FIG. 20. At step S1, the server 2004 receives a client request for a model query over the network. This connection is held open as the client 2002 waits for the results. The server 2004 generates a database query and executes the query on the database 2006 (step S2*a*) and retrieves in response a query identifier (step S2*b*) corresponding to the query.

While the query is executing on the database 2006, the server 2004, at some interval, checks for the existence of the network connection to the client 2002 (step S3). In one implementation, non-blocking sockets may be used. For example, the server 2004 performs a non-blocking read on the client-server connection. If the non-blocking read fails, then this indicates that the client 2002 is no longer listening for the response from the database 2006. If the client connection check fails, then this indicates that the client 2002 is no longer awaiting the response of the model query (step S4). In one example, the user may have closed the browser page in the browser application. The server 2004 transmits a new command to the database 2006, causing the server 2006 to stop the query using the query identifier returned in step S2. Alternatively, if the query completes and the client connection is still available, then the server 2004 returns the results to the client 2002 in normal course.

Accordingly, embodiments of the disclosure create a 1-to-1 mapping between a network connection and an executing query. Some embodiments rely on this connectivity to determine whether the query should be canceled. A closed socket implies that the query should not continue executing, which results in the cancelation of a query.

According to various embodiments, sockets comprise computing libraries with Application Programming Interfaces (APIs) that allow one computing device (such as the client 2002) to communicate with another computing device (such as server 2004).

According to various embodiments, normal sockets are considered "blocking" sockets, meaning that if a socket connection is open and an attempt to read from that socket is performed by a first computing device onto a second computing device, an operating system of the first computing device will wait until some data is returned from the second computing device. This is called "blocking" because if there are instructions that should be performed after performing a read on the socket, then those instructions will not be reached unless some data is received as a result of the read on the socket, i.e., the operating system of the first computing device is "stuck" waiting on data from the second computing device.

Non-blocking sockets, on the other hand, allow the operating system of the first computing device to raise an error instead of just waiting indefinitely. In some implementations of non-blocking sockets, a certain error type implies that the socket has no data available to it. In some embodiments, setting a non-blocking socket includes using a file or an IO (input/output) operation to set a file descriptor. For example, the function fnctl( ), which can be used to perform various operations on a file descriptor, may set the file descriptor to "O_NONBLOCK."

Once a socket is connected between two computing devices and after the socket has been made non-blocking, embodiments of the disclosure attempt to read a single byte from the socket using the command read(1). The read( ) function is described in IEEE Standard 1003.1.

In one embodiment, a specific error code may be used when there is no data to be read from a connected socket. For example, error messages that can be raised, include "EAGAIN" or "EWOULDBLOCK." In some embodiments, for web requests, after a browser has completed the initial request, there is no more data to be read from the socket at the server end, i.e., the web browser sends an entire request and then sends no more data, but instead waits to get the response from the server.

Figure 21:
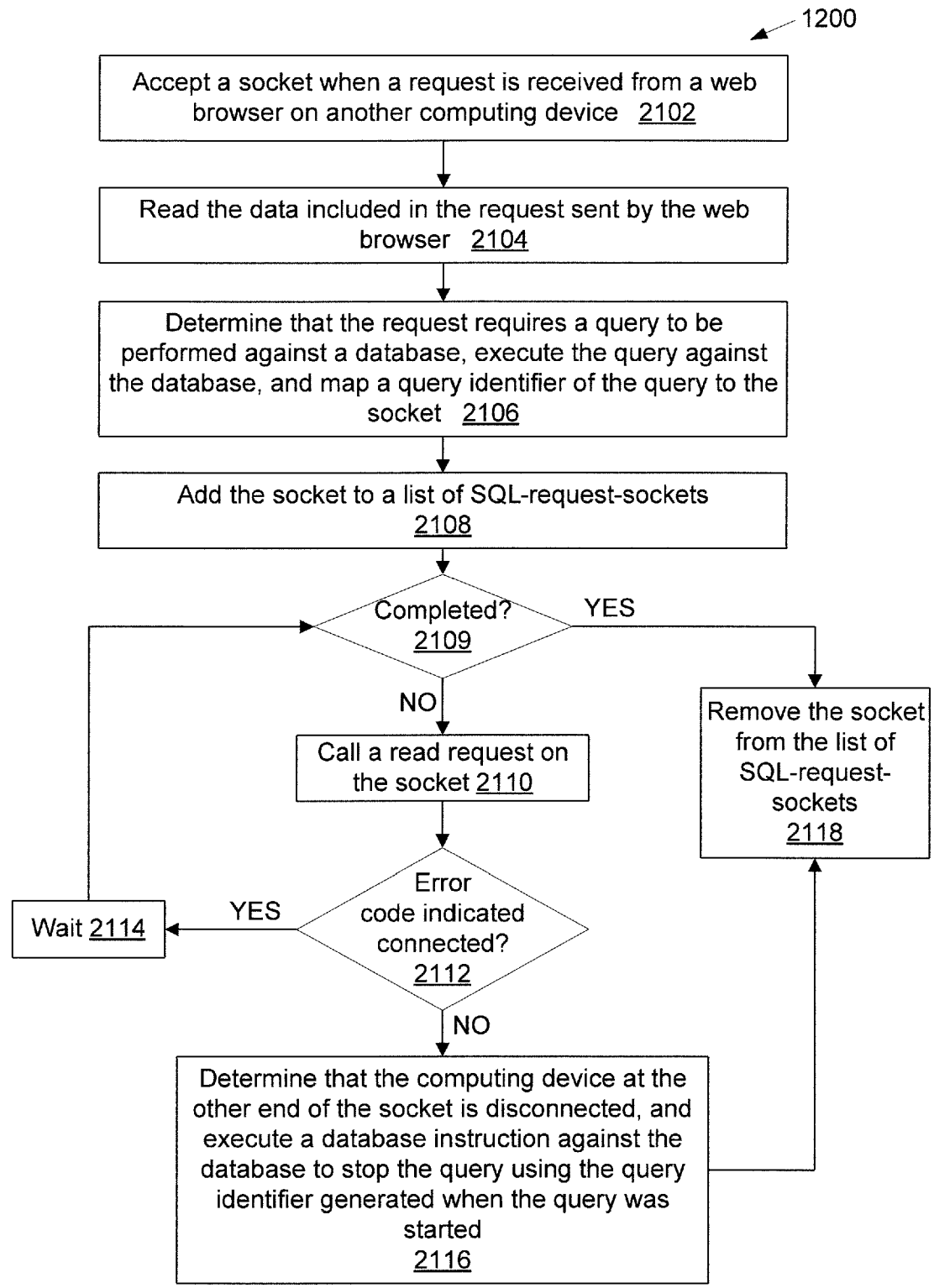
FIG. 21 is a flow diagram of method steps for cancelled a query, according to one embodiment.

FIG. 21 is a flow diagram of method steps for cancelled a query, according to one embodiment. As shown, the method 2100 begins at step 2102, where a server computing device, such as web server 2004, accepts a socket when a request is received from a web browser on another computing device. The request may be for the server computing device to perform a query against a database. In one embodiment, accepting a socket includes taking a reference to a socket and calling a function, such as "accept( )", to accept a connection on the socket. At step 2104, the server computing device reads all the data included in the request sent by the web browser.

At step 2106, the computing device determines that the request requires a query (such as an SQL query or other type of query) to be performed against a database, executes the query against the database, and maps a query identifier of the query to the socket. At step 2108, the server computing device adds the socket to a list of SQL-request-sockets. The list is stored in a memory of the server computing device and is maintained by the server computing device.

At step 2109, the server computing device determines whether the query against the database has completed. If the server computing device determines that the query has completed, then the method 2100 proceeds to step 2118, described below. If the server computing device determines that the query has not yet completed, then the method proceeds to step 2110.

At step 2110, the server computing device calls a read request (such as read(1)) on the socket. In some embodiments, the server computing device is configured to call a read request on each socket included in the list of SQL-request-sockets. At step 2112, the server computing device determines whether the response from the read request comprises an error code that indicates that the other computing device at the other end of the socket is connected, or whether the response from the read request is any other error code. Examples of error codes that indicate that the other computing device at the other end of the socket is connected are "EAGAIN" or "EWOULDBLOCK."

If the error code indicates that the other computing device at the other end of the socket is connected, then the method proceeds to step 2114, where the server computing device waits for a predetermined time period. For example, the server computing device may wait for 5 seconds before attempting to check for socket connectivity again. The method 2100 then returns to step 2109, described above. As such, read requests are performed on the socket at a periodic interval. The interval may be variable and/or configurable.

If, at step 2112, the response from the read request is any other error code (implying that the computing device at the other end of the socket is not connected), then the method 2100 proceeds to step 2116, where the server computing device determines that the computing device at the other end of the socket is disconnected, and executes a database instruction against the database to stop the query using the query identifier generated when the query was started, where the database is configured to stop the query responsive to such stop-query instruction. In some embodiments, the data instruction comprises a second database query against the database.

At step 2118, the server computing device removes the socket from the list of SQL-request-sockets. The method 2100 then terminates.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for querying a database, the method comprising:

receiving, by a server computing device, a query input from a client computing device over a network connection;

establishing a non-blocking socket between the client computing device and the server computing device wherein the non-blocking socket automatically returns an error code when the client computing device fails to transmit data to the server computing device;

generating by the server computing device, a database query against a database based on the input query and causing the database query to begin executing against one or more databases;

responsive to the database query executing, performing, by the server computing device, a read request on the non-blocking socket wherein the read request is an automated request for the client computing device to transmit data to the server computing device through the non-blocking socket;

receiving the error code in response to the read request on the non-blocking socket;

determining whether the network connection exists between the client computing device and the server computing device based on the received error code; and executing a database instruction against the one or more databases, which causes the database query to be cancelled when the server determines that the network connection does not exist between the client computing device and the server computing device.

2. The method of claim 1, further wherein the read request is performed periodically.

3. The method of claim 1, wherein different queries input from different client computing devices over the network connection are received by the server computing device, wherein a one-to-one mapping exists between each non-blocking socket and each corresponding database query and wherein the read request is performed periodically against each non-blocking socket.

4. A data processing system configured for querying a database, the data processing system comprising:

a host computing system comprising a server computing device with one or more computers, each with memory and at least one processor;

the server computing device in communication with one or more databases over a communications network;

an application executing in the host computing system; and a database query cancelling module coupled to the application, the database query cancelling module comprising program code enabled to:

receive, by the server computing device, a query input from a client computing device over a network connection;

establish a non-blocking socket between the client computing device and the server computing device wherein the non-blocking socket automatically returns an error code when the client computing device fails to transmit data to the server computing device;

generate, by the server computing device, a database query based on the input query and causing the database query to begin executing against the one or more databases;

responsive to the database query executing, perform, by the server computing device, a read request on the non-blocking socket wherein the read request is an automated request for the client computing device to transmit data to the server computing device through the non-blocking socket;

receive the error code in response to the read request on the non-blocking socket;

determine whether the network connection exists between the client computing device and the server computing device based on the received error code; and execute a database instruction against the one or more databases, which causes the database query to be cancelled when the server computing device determines that the network connection does not exist between the client computing device and the server computing device.

5. The system of claim 4, wherein the read request is performed periodically.

6. The system of claim 4, wherein different queries input from different client computing devices over the network connection are received by the server computing device, wherein a one-to-one mapping exists between each non-blocking socket and each corresponding database query and wherein the read request is performed periodically against each non-blocking socket.

7. A computer program product for querying a database, the computer program product comprising a computer readable storage medium having program instructions embodied therewith, the program instructions executable by a device to cause the device to perform a method comprising:

receiving, by a server computing device, a query input from a client computing device over a network connection;

establishing a non-blocking socket between the client computing device and the server computing device wherein the non-blocking socket automatically returns an error code when the client computing device fails to transmit data to the server computing device;

generating by the server computing device, a database query against a database based on the input query and causing the database query to begin executing against one or more databases;

responsive to the database query executing, performing, by the server computing device, a read request on the non-blocking socket wherein the read request is an automated request for the client computing device to transmit data to the server computing device through the non-blocking socket;

receiving the error code in response to the read request on the first non-blocking socket;

determining whether the network connection exists between the client computing device and the server computing device based on the received error code; and executing a database instruction against the one or more databases, which causes the database query to be cancelled when the server determines that the network connection does not exist between the client computing device and the server computing device.

8. The computer program product of claim 7, wherein the read request is performed periodically.

9. The computer program product of claim 7, wherein different queries input from different client computing devices over the network connection are received by the server computing device, wherein a one-to-one mapping exists between each non-blocking socket and each corresponding database query and wherein the read request is performed periodically against each non-blocking socket.

* * * * *